(12) United States Patent
Montreuil et al.

(10) Patent No.: US 7,499,822 B2
(45) Date of Patent: Mar. 3, 2009

(54) ANALOG SET TOP CALIBRATION PATTERNS IN MANUFACTURING

(75) Inventors: Leo Montreuil, Atlanta, GA (US); Wayne B. Williams, Grayson, GA (US); Samuel H. Russ, Lawrenceville, GA (US); Robert A. Kriete, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/427,745

(22) Filed: Jun. 29, 2006

(65) Prior Publication Data

US 2008/0004830 A1    Jan. 3, 2008

(51) Int. Cl.
*G06F 3/02* (2006.01)
(52) U.S. Cl. ............... 702/117; 702/118; 702/119; 702/122
(58) Field of Classification Search ......... 702/117–123, 702/127, 182, 186; 345/472; 715/717; 725/46, 725/9–21; 348/183
See application file for complete search history.

(56) References Cited

U.S. PATENT DOCUMENTS

| | | | | |
|---|---|---|---|---|
| 4,334,307 A * | 6/1982 | Bourgeois et al. | ............ | 714/45 |
| 5,920,340 A | 7/1999 | Man et al. | | |
| 6,057,882 A | 5/2000 | Van Den Branden et al. | | |
| 6,441,782 B2 * | 8/2002 | Kelly et al. | ................. | 342/359 |
| 6,734,898 B2 * | 5/2004 | Zeidler | ...................... | 348/183 |
| 6,741,277 B1 | 5/2004 | Rau | | |
| 6,828,993 B1 * | 12/2004 | Hendricks et al. | ........... | 715/819 |
| 7,013,478 B1 * | 3/2006 | Hendricks et al. | ............. | 725/46 |
| 7,043,691 B1 * | 5/2006 | Kwon et al. | ................ | 715/705 |
| 2005/0005287 A1 * | 1/2005 | Claussen | ..................... | 725/31 |

FOREIGN PATENT DOCUMENTS

| | | |
|---|---|---|
| EP | 0 716 312 | 6/1996 |
| EP | 0 896 483 | 2/1999 |
| GB | 2 336 063 | 10/1999 |

OTHER PUBLICATIONS

U.S. Appl. No. 11/427,742, filed Jun. 29, 2006, Entitled "Set Top Calibration Patterns in Manufacturing," Inventors: Leo Montreuil et al.
U.S. Appl. No. 11/427,747, filed Jun. 29, 2006, Entitled "Generated Set Top Calibration Patterns in Manufacturing," Inventors: Leo Montreuil et al.

* cited by examiner

*Primary Examiner*—Eliseo Ramos Feliciano
*Assistant Examiner*—Felix E Suarez

(57) ABSTRACT

Included are systems and methods for performing a functionality test to an STT. At least one embodiment of a method includes storing at least one test pattern in a storage device, decoding the at least one stored test pattern, and sending the test pattern from a output port to an input port, the input port being coupled to at least one tuning device. Other embodiments include tuning, via the at least one tuning device, the STT according to the test pattern and converting the decoded test pattern to at least one output signal.

21 Claims, 28 Drawing Sheets

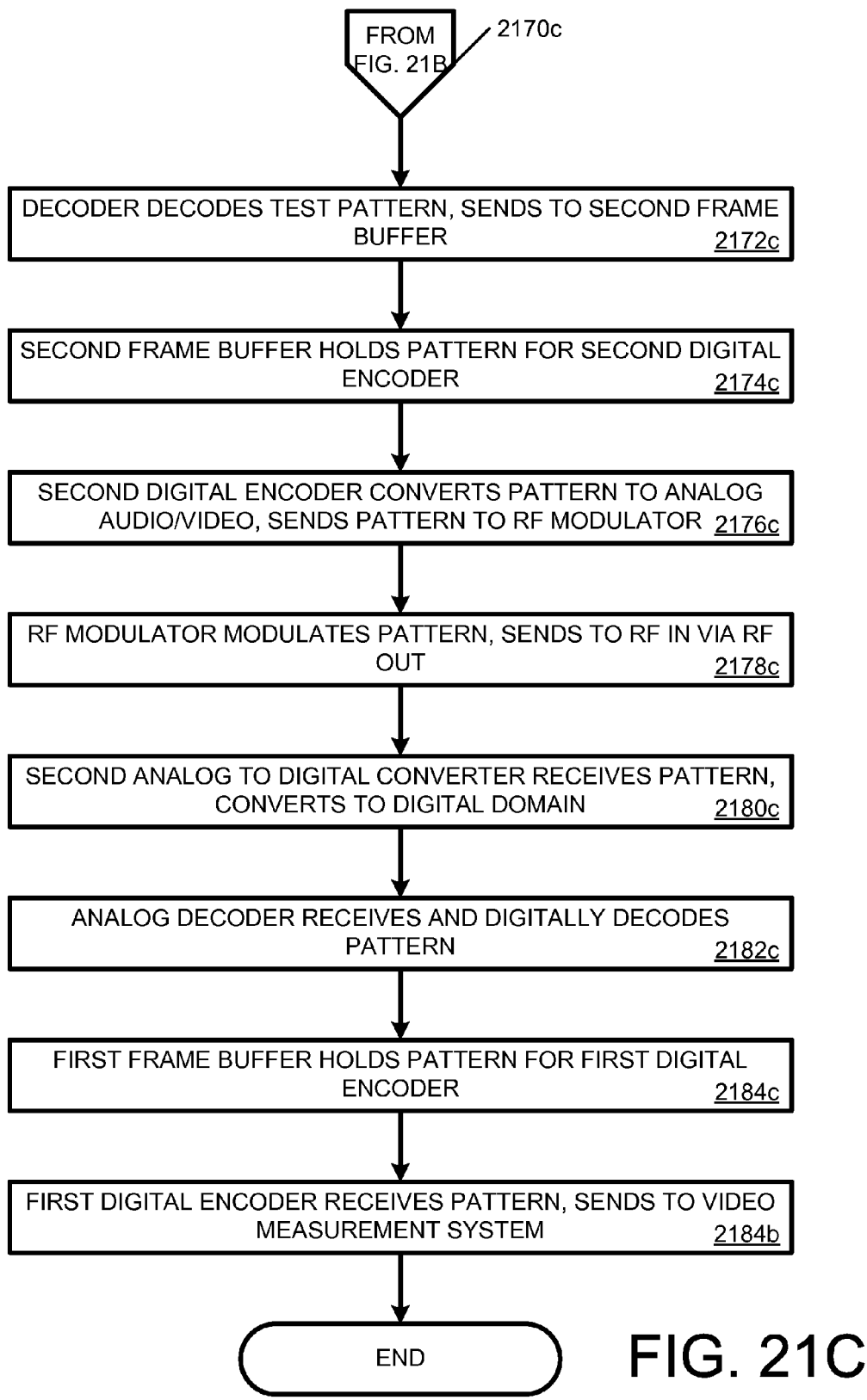

ANALOG SET TOP CALIBRATION PATTERNS IN MANUFACTURING

CROSS REFERENCE

This application is related to copending U.S. Utility Patent Applications entitled "Set Top Calibration Patterns in Manufacturing" and "Generated Set Top Calibration Patterns in Manufacturing" filed on the same day as the present application and accorded Ser. Nos. 11/427,742 and 11/427,747, respectively, each of which is incorporated by reference in its entirety.

TECHNICAL DESCRIPTION

The present disclosure is related to error detection in a Set Top Terminal and, more specifically, to the communication of video data for error detection.

BACKGROUND

In the manufacturing of cable boxes, satellite boxes, televisions, etc. (collectively referred to herein as set top terminals (STTs)), a certain level of quality control may be implemented. As an STT can be configured to receive incoming audio, video, and/or data signals and facilitate display of those signals, a manufacturer may desire the knowledge of common problems that occur in the manufactured STTs, as well as the knowledge of commonality of those problems. More specifically, functionality tests of the audio, video, processing, and other aspects of the STT may be performed on a predetermined number (and/or percentage) of STTs during the manufacturing process. As these tests are performed, the manufacturer can determine common problems in manufactured STTs, as well as determine ways to reduce the number of problems with STTs manufactured in the future.

One of the tests that a manufacturer may perform on an STT is a test of the video output signal from an STT. This testing is critical as it determines the ability of an STT to perform its primary function—the delivery of video for viewing in a home. However, this testing may also require test equipment that is prone to failure, requiring continuous calibration and maintenance and causing false failures. Also, such testing may only test selected portions of the STT's video output circuitry or may duplicate testing of other functions of the STT. Thus, there is a need in the industry to address these deficiencies and inadequacies.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 21C is a continuation of the flowchart from FIG. 20B.

DETAILED DESCRIPTION

Figure 1:
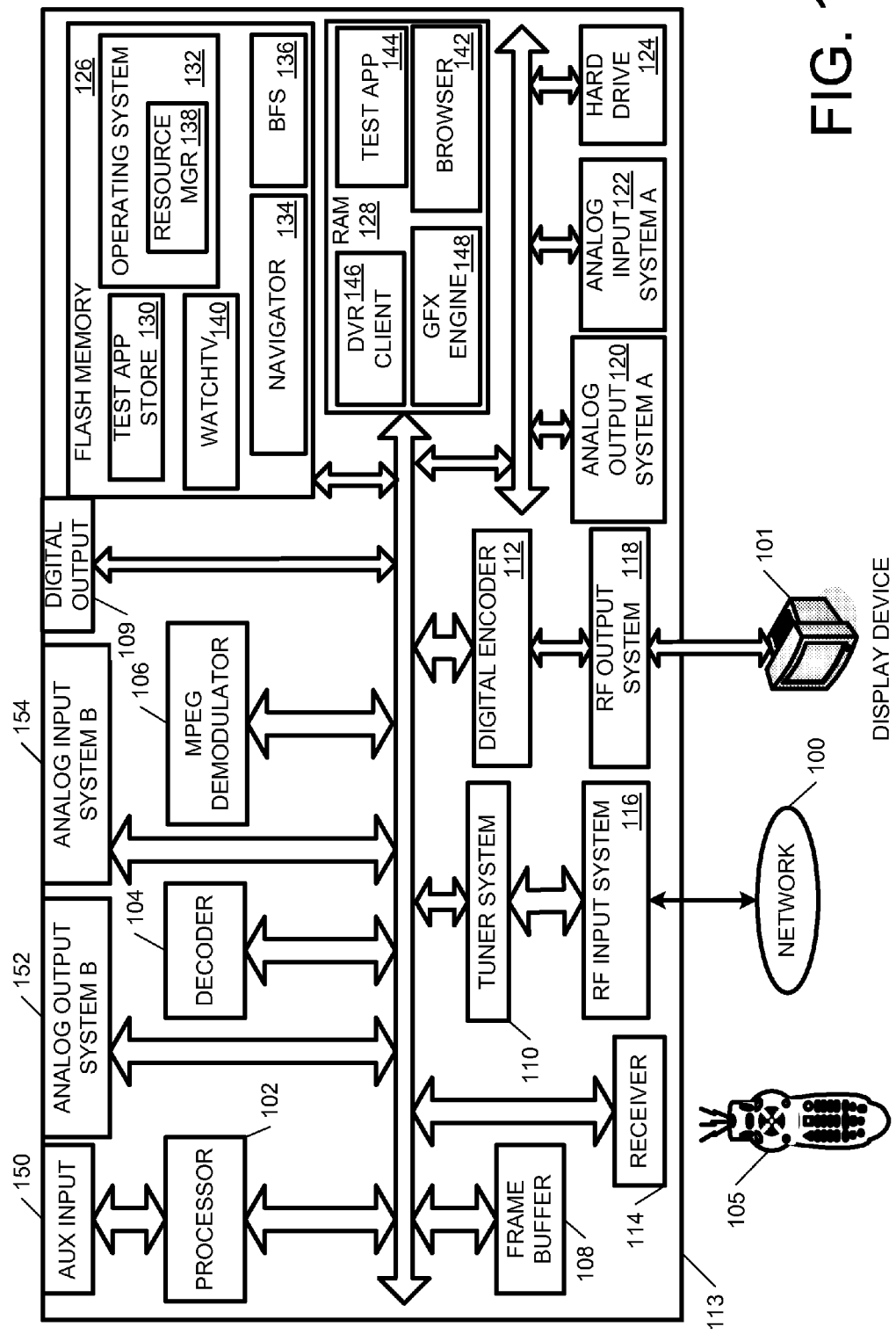
FIG. 1 is a block diagram illustrating exemplary components of a digital STT, which may be utilized in a media network.

FIG. 1 is a block diagram illustrating exemplary components of a single tuner digital STT, which may be utilized in a media network. More specifically, STT 113 can be utilized in a media network, such as a Cable Television System (CTS), Internet Protocol (IP) network, fiber-to-home network, Digital Subscriber Line (DSL), and/or other network, such as is disclosed in application Ser. No. 11/143,522, which is hereby incorporated by reference in its entirety. As illustrated in FIG. 1, STT 113 may be configured to include a radio frequency (RF) output system 118, which may be coupled to a display device 101, such as a television, computer monitor, etc. The RF output system 118 may be configured to receive data from a digital encoder 112. STT 113 additionally includes is an RF input system 116, which can be configured to communicate with the media network 100, which may or may not include a headend (not shown). As discussed in more detail below, the RF input system 116 and the RF output system 118 may include one or more components such as an RF input port and an RF output port, respectively. Also included is a receiver 105 for receiving user commands via a remote control 105.

The STT 113 may also include a first analog output system 120, a second analog output system 152, a digital video output system 109, and an analog input system 150. As non-limiting examples, the analog video outputs may be auxiliary video baseband signals (CVBS), S-Video, high-definition Y/Pr/Pb component video, R/G/B component video, or a combination of the above. As another non-limiting example, the digital video output may be Digital Video Interface—Analog (DVI-A), Digital Video Interface—Digital (DVI-D), or High Definition Multimedia Interface (HDMI). While illustrated in FIG. 1 as analog output systems, these input and output systems can include any analog and/or digital Input/Output (I/O) systems and may be configured to facilitate communication of data between the STT and other devices.

The STT 113 may also include a data storage infrastructure, such as Random Access Memory (RAM) 128 (which may include Dynamic RAM (DRAM), Video RAM (VRAM), Static RAM (SRAM), and/or other components) and flash memory 126. RAM 128 may include one or more software programs including a Digital Video Recorder (DVR) client 146 for receiving and storing received programming data, a graphics engine 148, a test application 144 and a browser 142. Similarly, flash memory 126 can include test application store 130, a watchTV component 140, and an operating system 132, which may include a resource manager component 138. Also included is a hard drive 124. As one of ordinary skill in the art will understand, while certain components of FIG. 1 are illustrated as being stored in flash memory and other components are illustrated as being stored in RAM, this is a nonlimiting example. Depending on the particular configuration, any of these components may reside in either (or both) flash memory 126, RAM 128, and the hard drive 124. Additionally, other storage devices (volatile and/or nonvolatile storage) may also be included in the STT 113 for storing and providing access to these and other components.

The STT 113 may also include a processor 102 for executing instructions from the flash memory 126, RAM 128, hard drive 124, and/or other sources. A decoder 104 may be included for decoding received data, and a Movie Picture Experts Group (MPEG) demodulator 106 for demodulating the received data. A frame buffer 108, a tuner system 110, and a digital encoder 112 may also be included.

One should note that while various components are illustrated in STT 113, this is a nonlimiting example. More specifically, more or fewer components may be included to provide functionality for a particular configuration. Additionally, while the components of STT 113 are arranged in a particular manner, this is also a nonlimiting example, as other configurations are also considered.

Figure 2:
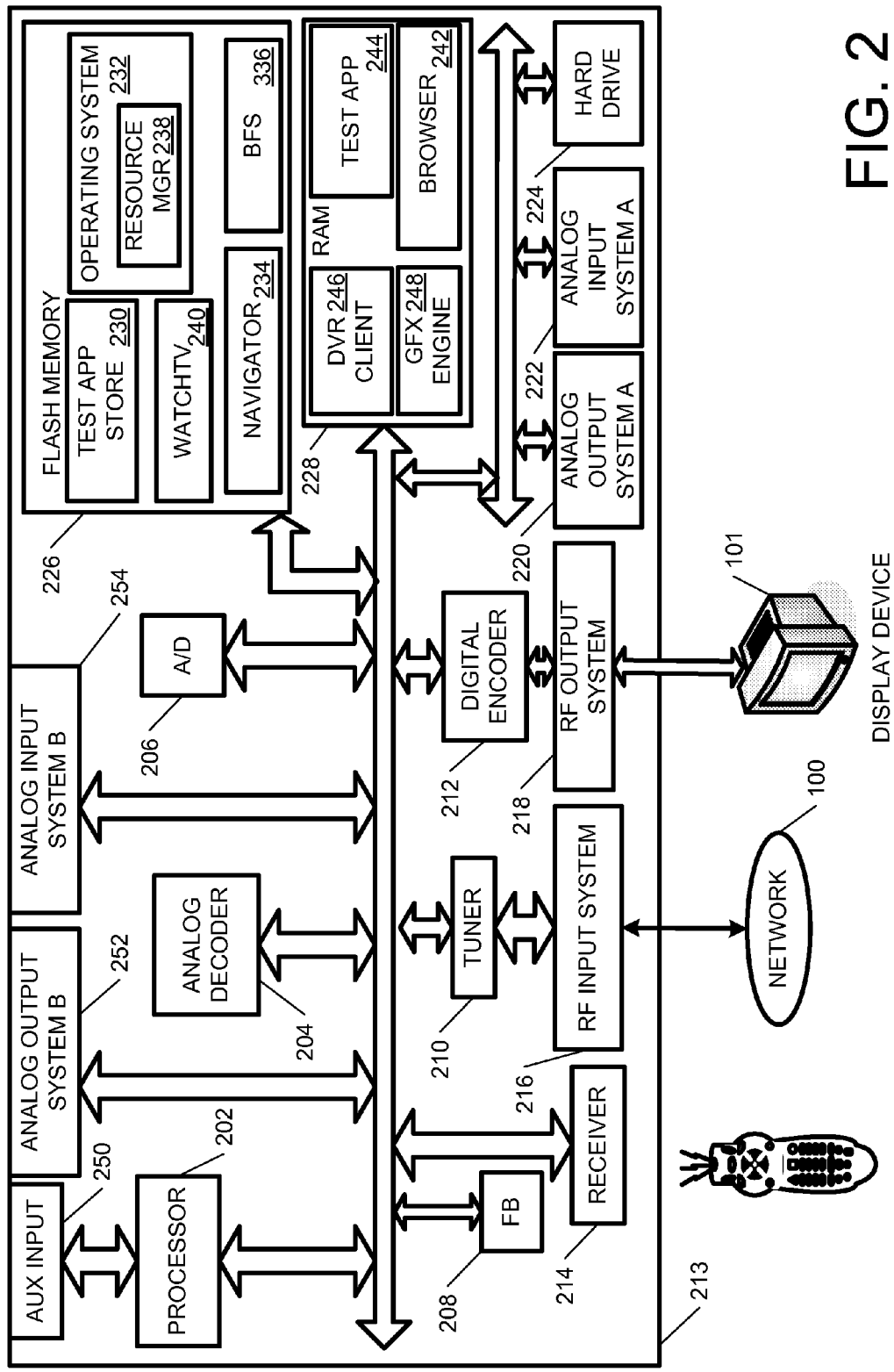
FIG. 2 is a block diagram illustrating exemplary components of an analog STT, similar to an STT from FIG. 1.

FIG. 2 is a block diagram illustrating exemplary components of an analog STT, similar to an STT from FIG. 1. One should note that this set-top is very similar to FIG. 1, except that it can also tune, decode, and display analog video inputs. As shown in the digital STT from FIG. 1, the Analog STT 213 includes a receiver 314, an RF input system 316 that can be configured to communicate with media network 100, which may include a headend (not shown). An RF output system 218 may also be included and configured to send and receive data from a display device 101 such as a television, monitor, computer, etc. The analog STT 213 may also include a first analog output system 220 and a first analog input system 222, as well as a second analog output system 252 and a second analog input system 254. The analog STT 213 may also include an auxiliary input 250.

Also similar to the digital STT 113, the analog STT 213 may include a flash memory component 226, a RAM component 228 and a hard drive 224. The flash memory component 226 may include a test application store 233, a watchTV component 240, a navigator 234, a boot file system (BFS) 236 and an operating system 232 with a resource manager 238. The RAM 228 may include a DVR client 246, a graphics engine 248, a browser 242, and a test application component 234. Other configurations and/or components are also contemplated.

The analog STT 213 may also include a processor 202 for executing instructions stored in one or more of the volatile and nonvolatile memory components, an analog decoder 204, an analog to digital converter 206, a frame buffer 208, a tuner 210 and a digital encoder 212. Other components may be included to provide the desired functionality. Additionally, while a digital STT 113 is depicted in FIG. 2 and an analog STT 213 is depicted in FIG. 2, the functionality and/or components of these embodiments can be included in a single STT, depending on the configuration.

Figure 3:
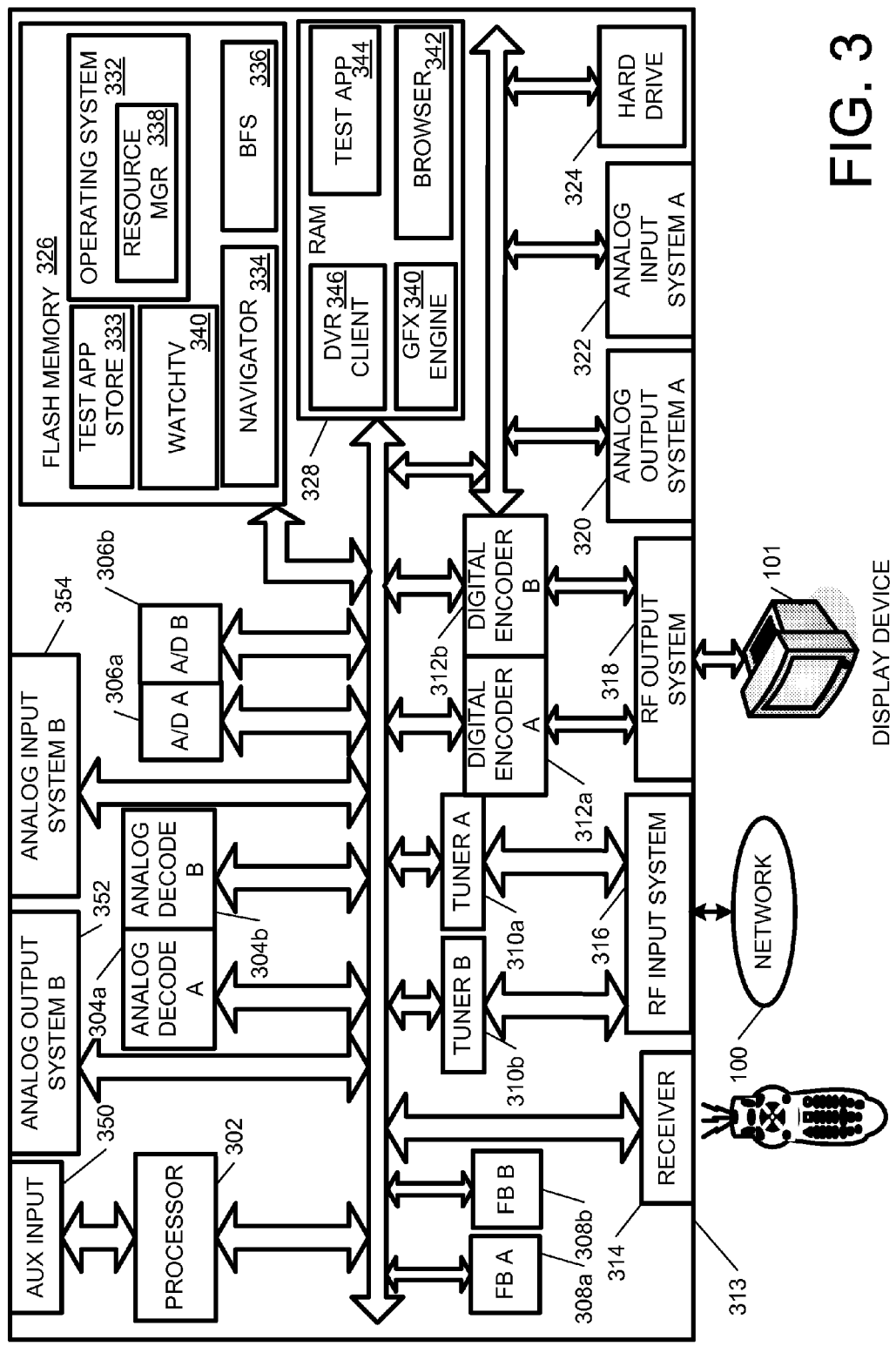
FIG. 3 is a block diagram illustrating exemplary components of a multi-tuner analog STT, similar to an STT from FIG. 1.

FIG. 3 is a block diagram illustrating exemplary components of a multi-tuner analog STT, similar to an STT from FIG. 1. One should note that the addition of a second set of video outputs creates new demands for testing. As illustrated in FIG. 3, STT 313 includes a receiver 314 and an RF input system 316 that may be configured to communicate with media network 100. An RF output system 318 may also be included and configured to communicate with display device 101. The analog STT 313 may also include a first analog output system 320, a first analog input system 322, a second analog output system 352, a second analog input system 354, and an analog input system 350.

The multi-tuner analog STT 313 may also include flash memory 326, RAM 328, and a hard drive 324. The flash memory 326 may include test application store 333, a watchTV component 340, a navigator 334, a BFS component 336, and an operating system 332, which can include a resource manager 338. RAM 328 may include a DVR client 346, a graphics engine 340, a browser 342, and a test application 344.

The multi-tuner analog STT 313 may also include a processor 302, a first analog decoder 304a, a second analog decoder 304b, a first analog to digital converter 306a, a second analog to digital converter 306b, a first frame buffer 308a, a second frame buffer 308b, a first tuner 310a, a second tuner 310b, a first digital encoder 312a, and a second digital encoder 312b. As discussed above, more or fewer components arranged in any of a plurality of different configurations of STT 313 and may be considered as part of this disclosure.

One should note that although the STT of FIG. 3 includes pairs of components (e.g., analog decoder a 304b and analog decoder b 304b), this is a nonlimiting example. Depending on the particular configuration one or more of these pairs of components can be combined into a single component to provide the desired functionality.

One should note that while the nonlimiting example of FIG. 3 includes a plurality of tuners, as opposed to the nonlimiting example of FIG. 1, one should note that FIG. 3 illustrates a configuration with a plurality of video paths. In at least one embodiment, the plurality of video paths can be configured to provide a plurality of testing options for the components of STT 313. More specifically because alternate routings are possible, testing of the plurality of paths is often desired to confirm correct operation.

Figure 4:
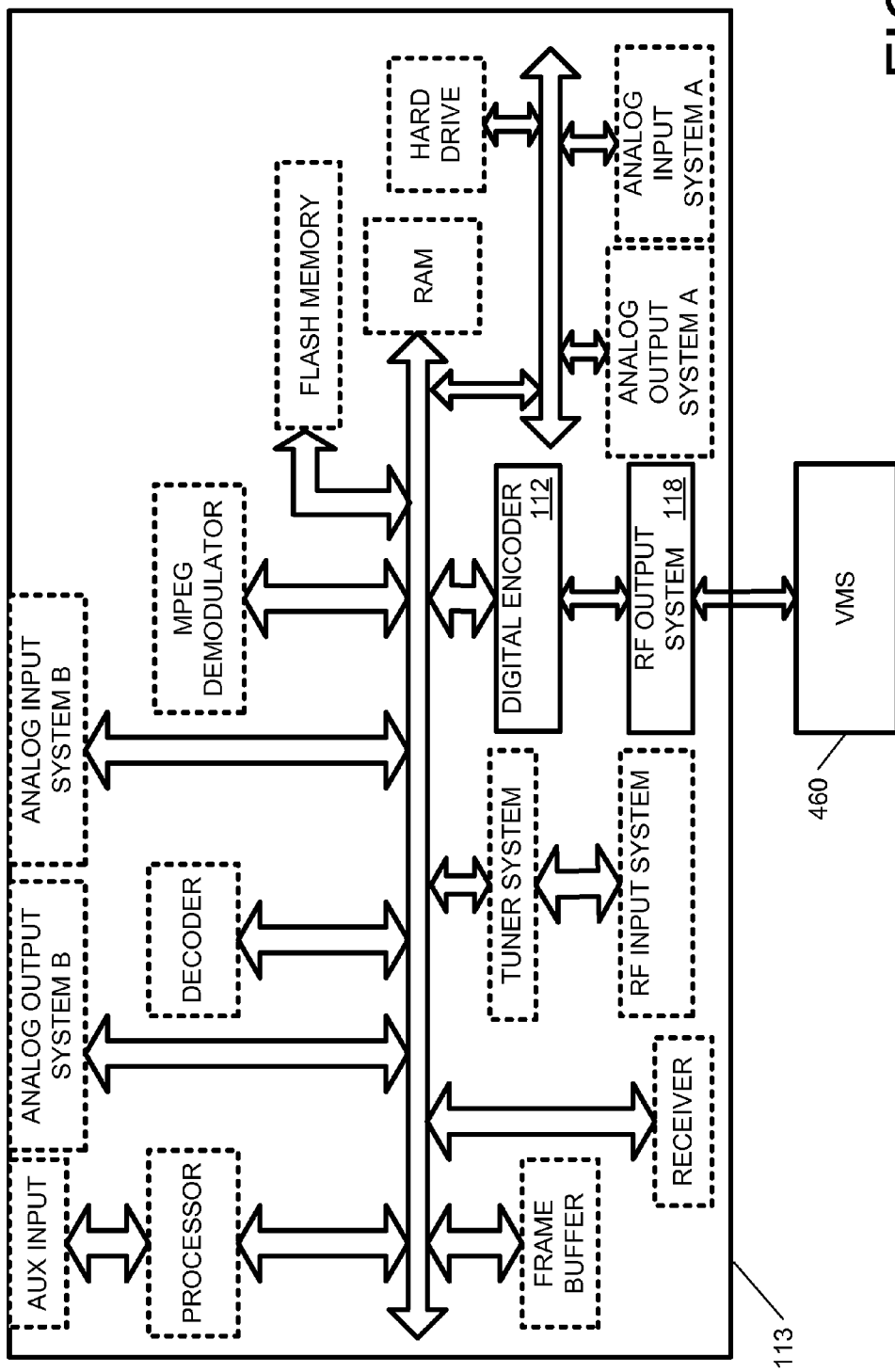
FIG. 4 is a block diagram illustrating exemplary components that may be active during a video test of the STT from FIG. 1.

FIG. 4 is a block diagram illustrating exemplary components that may be active during a video test of the STT from FIG. 1. More specifically, the video capabilities of the digital STT 113 can be determined during the manufacturing process by embedding a video test pattern into the digital encoder 112. Upon coupling a video measurement system (VMS) 460 to the RF output system 118, the digital encoder 112 can provide a display related to the test pattern for measurement. Generally speaking, while this test procedure can provide a manufacturer with the ability to determine whether the digital encoder 112 is operating properly, this test may not provide any information regarding other components of the digital STT 113.

In operation, the digital encoder 112 can be activated with an embedded test pattern. Upon activation, the digital encoder can send an analog video signal to the RF output system 118 for receipt by the VMS 460. The VMS 460 can then display the video for a determination of whether the digital encoder is operating properly. Other embodiments may also be configured such that the VMS 460 can perform various tests including, but not limited to a signal to noise ratio test, video frequency response, chroma/luma gain, chroma/luma delay, signal amplitude, etc.

One should note that, as illustrated in FIG. 4, the active components in the test of digital encoder 112 are those components depicted with solid lines. Those components depicted with dotted lines (or not included in FIG. 4) may or may not be active for this particular function.

Figure 5:
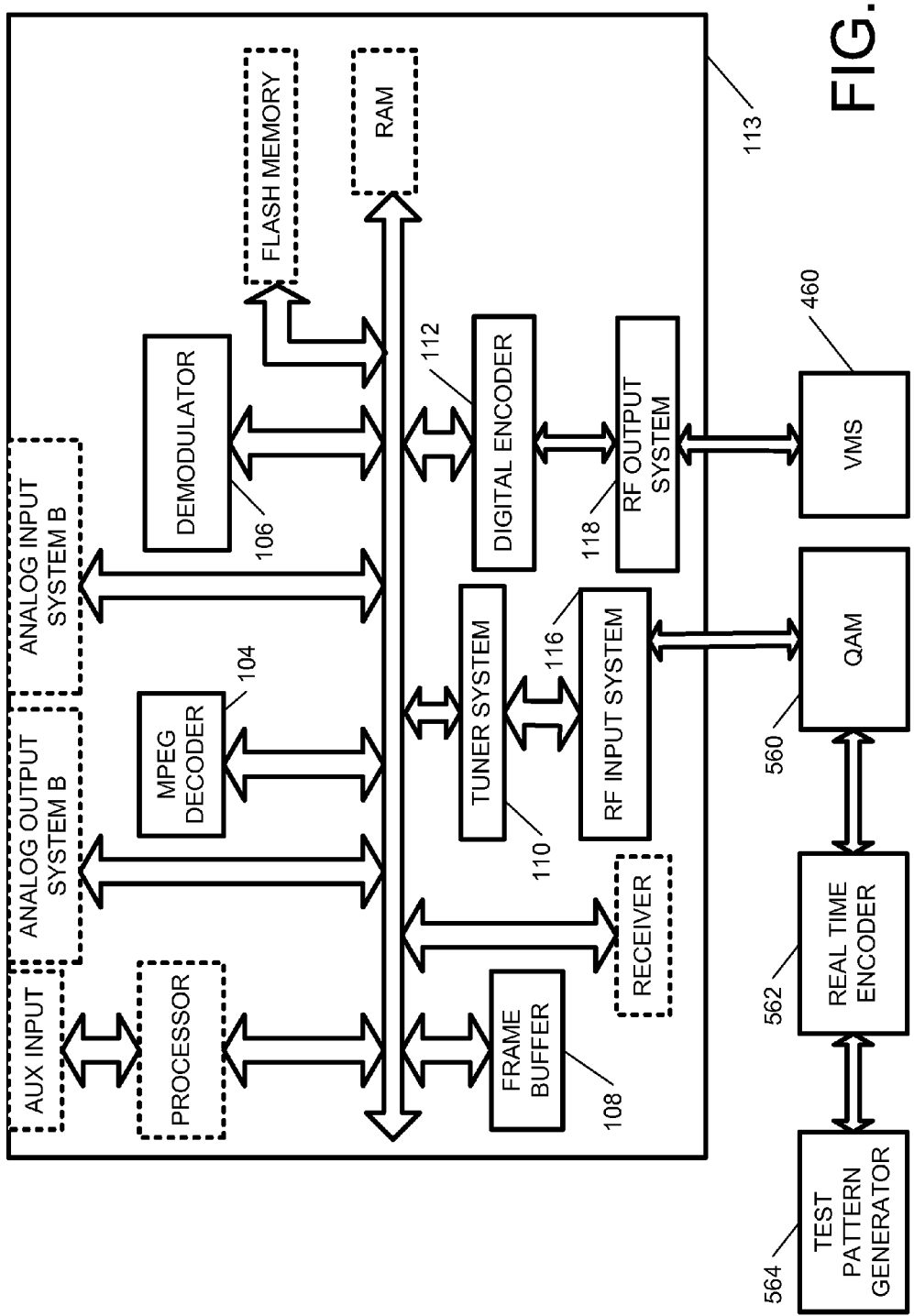
FIG. 5 is a block diagram illustrating exemplary components that may be active during a video system test of the STT from FIG. 1.

FIG. 5 is a block diagram illustrating exemplary components that may be active during a video system test of the STT from FIG. 1. The video test in this nonlimiting example includes attaching a test pattern generator 564, a real time encoder 562, and Quadrature Amplitude Modulator (QAM) 560 to the RF input system 161. The test pattern generator 564 can generate a test pattern for the video components of the digital STT 113. The test pattern can be sent to the real time encoder for encoding the test pattern into a format similar to a format that may be received from the network 100. Similarly, the QAM 560 can modulate the encoded test pattern according to a QAM protocol. The modulated signal can then be sent to the RF input system 116. The RF input system 116 can send the received test pattern to the tuner system 110 for tuning to the STT 113 to a desired channel associated with the test pattern. The tuner system 110 can then send the test pattern to the demodulator 106 for demodulation. The demodulator 106 can send the demodulated test pattern to the MPEG decoder 104, which can decode the test pattern according to a desired MPEG decoding scheme. The MPEG decoder 104 can then send the decoded test pattern to the frame buffer 108. The frame buffer 108 can send the received test pattern to the digital encoder 112, which can convert the digital test pattern into an analog video signal. The digital encoder 112 sends the analog video test pattern to the RF output system 118 for testing on the VMS 460. While the above illustrates a configuration, among others for testing analog video output quality of a digital-only STT, this and/or other methods can be used to test other STT (e.g., satellite, terrestrial-digital STTs, etc.).

One should note that while the above configuration can provide video testing for the digital STT 113, the inclusion of external test equipment, such as a test pattern generator 564, a real time encoder 562, and QAM 560 can provide flawed signals. In providing a flawed signal, errors detected by the VMS 460 may originate from the test equipment, as opposed to the digital STT 113. In such a scenario, a difficulty may arise when the VMS 460 detects an error in the video output.

Additionally, by simulating a signal from the network 100 via external test equipment, an operator may be testing a larger number of STT components than desired. As a nonlimiting example, by including the tuner system 110 and other components in the video test, an operator may have difficulty in determining the cause of an error. One should also note that other tests, such as signal-to-noise and/or bit-error rate can test digital tuners. More specifically, these tests can be configured to test a tuner in isolation from the rest of the system. Additionally use of tuners in testing video outputs can create duplicative testing that may direct repair efforts incorrectly.

Figure 6:
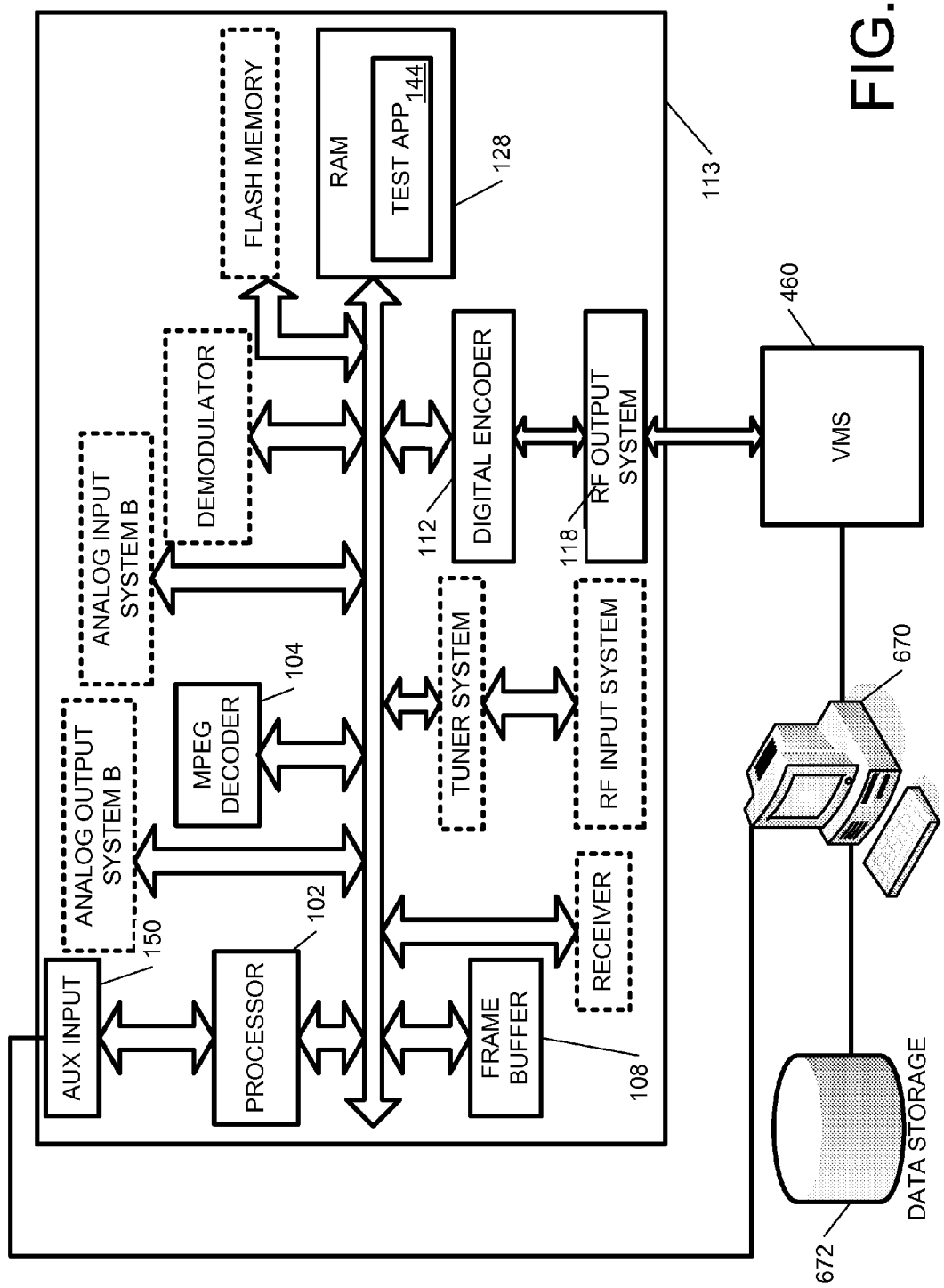
FIG. 6 is a block diagram illustrating exemplary components that may be active during an internal video test of the STT from FIG. 1.

FIG. 6 is a block diagram illustrating exemplary components that may be active during an internal video test of the STT from FIG. 1. More specifically, in this nonlimiting example, test application 144 in RAM 128 can include a test pattern. The stored test pattern can include a mathematically perfect pattern for communication to the VMS 460. Because the test application includes this mathematically perfect test pattern, any deviation from stored test pattern to the test pattern sent to the VMS 460 can be attributed to flaws associated with one or more components of the digital STT 113.

In operation, the test application component 144 can send the test pattern to the MPEG decoder 104 for decoding. The MPEG decoder 104 can decode the test pattern and send the decoded test pattern to the frame buffer 108. The frame buffer 108 can hold the decoded test pattern for the digital encoder 112. The frame buffer 108 can then send the test pattern to the digital encoder 112, which can convert the test pattern into analog video (and/or audio) and send the analog signal to the RF output system 118 and/or to the analog output systems 320 or 322. The VMS 460 can then test the video components of the digital STT 113. Generally speaking, a measurable deviation from the standard (assuming correct calibration of the VMS 460), generally indicates a fault in the video output circuitry of STT 113.

Figure 7:
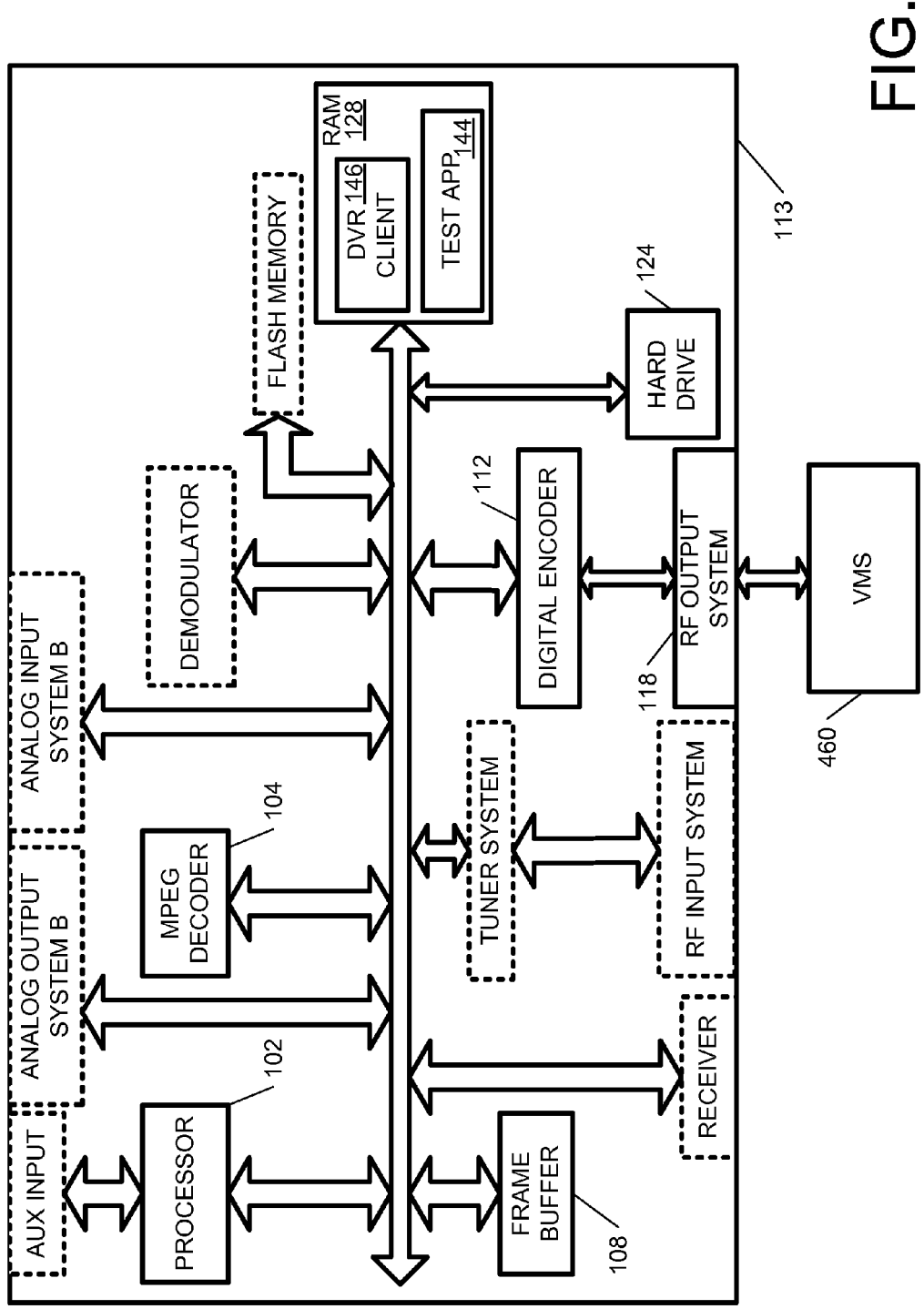
FIG. 7 is a block diagram illustrating exemplary components that may be active during an internal video test of an STT with DVR capabilities, similar to the STT from FIG. 1.

Additionally depicted in the nonlimiting example of FIG. 6 is a computing device 670, which may be configured to send the test commands to the processor 102. The processor 102 can then facilitate the communication of the test pattern in RAM 128 to the MPEG decoder 104. The computing device 670 can also send commands to the VMS 460 for performing any of a plurality of different video tests on the digital STT 113. In at least one non-limiting example, the commands may cause the VMS to switch between testing of analog baseband video and RF-modulated video. Upon receiving the results of the tests, the VMS 460 can send this data to the computing device 670, which can send the data to a storage device 660. Test data from a plurality of tested STTs can be compiled at data storage 672 for further analysis FIG. 7 is a block diagram illustrating exemplary components that may be active during an internal video test of an STT with DVR capabilities, similar to the STT from FIG. 1. More specifically, in this nonlimiting example, the test pattern may be stored on the hard drive 124, similar to data stored by the DVR client 146. In operation, the processor 102 can be configured to facilitate execution of the DVR client 146 for purposes of video testing. Upon execution of the DVR client 146, one embodiment of the STT 113 can be configured for the MPEG decoder 104 to read the test pattern directly from the hard drive 124. Other embodiments can be configured for the hard drive 124 to copy the test pattern to the test application component 144 in RAM 128. RAM 128 can then send the test pattern to the MPEG decoder 104.

Figure 8:
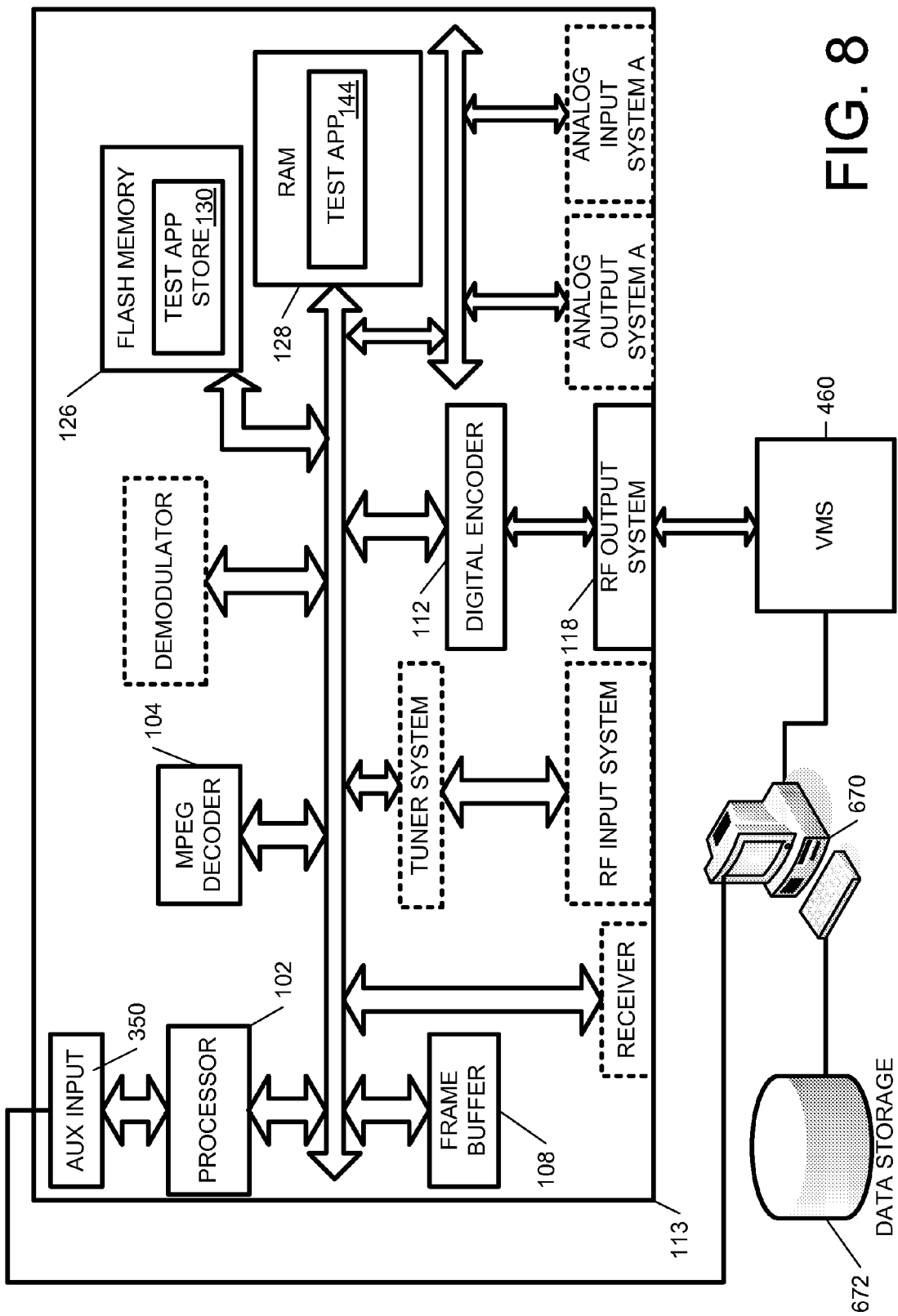
FIG. 8 is a block diagram illustrating exemplary components that may be active during an internal video test of an STT with utilization of flash memory, similar to the STT from FIG. 1.

Similar to the configuration from FIG. 7, the STT 113 in FIG. 8 can also be configured such that the MPEG decoder 104 sends the test pattern to the frame buffer 108. The frame buffer 108 can send the test pattern to the digital encoder 112. The digital encoder 112 can then convert the test pattern to analog video (and/or audio) and send the analog signal to the VMS 460 via the RF output system 118.

FIG. 8 is a block diagram illustrating exemplary components that may be active during an internal video test of an STT with utilization of flash memory, similar to the STT from FIG. 1. More specifically, in this nonlimiting example, as described with reference to FIG. 7, the test pattern can be stored in the test application store 130, which may be resident in flash memory 126. In FIG. 8, the test pattern can proceed to the digital encoder 112 as described with reference to FIG. 7. Upon receiving the test pattern, however, in the nonlimiting example of FIG. 8 the digital encoder 112 can convert the received test pattern into an analog signal and send that signal to the VMS 460 via the RF output system 118. The VMS 460 can analyze the received signal to determine whether the STT 113 is operating properly. Additionally, the computing device 670 can further analyze the received data and facilitate storage of the data at data storage 672. Additionally, as discussed above, computing device 670 can also be coupled to auxiliary input 350 for providing testing commands to processor 102.

Figure 9:
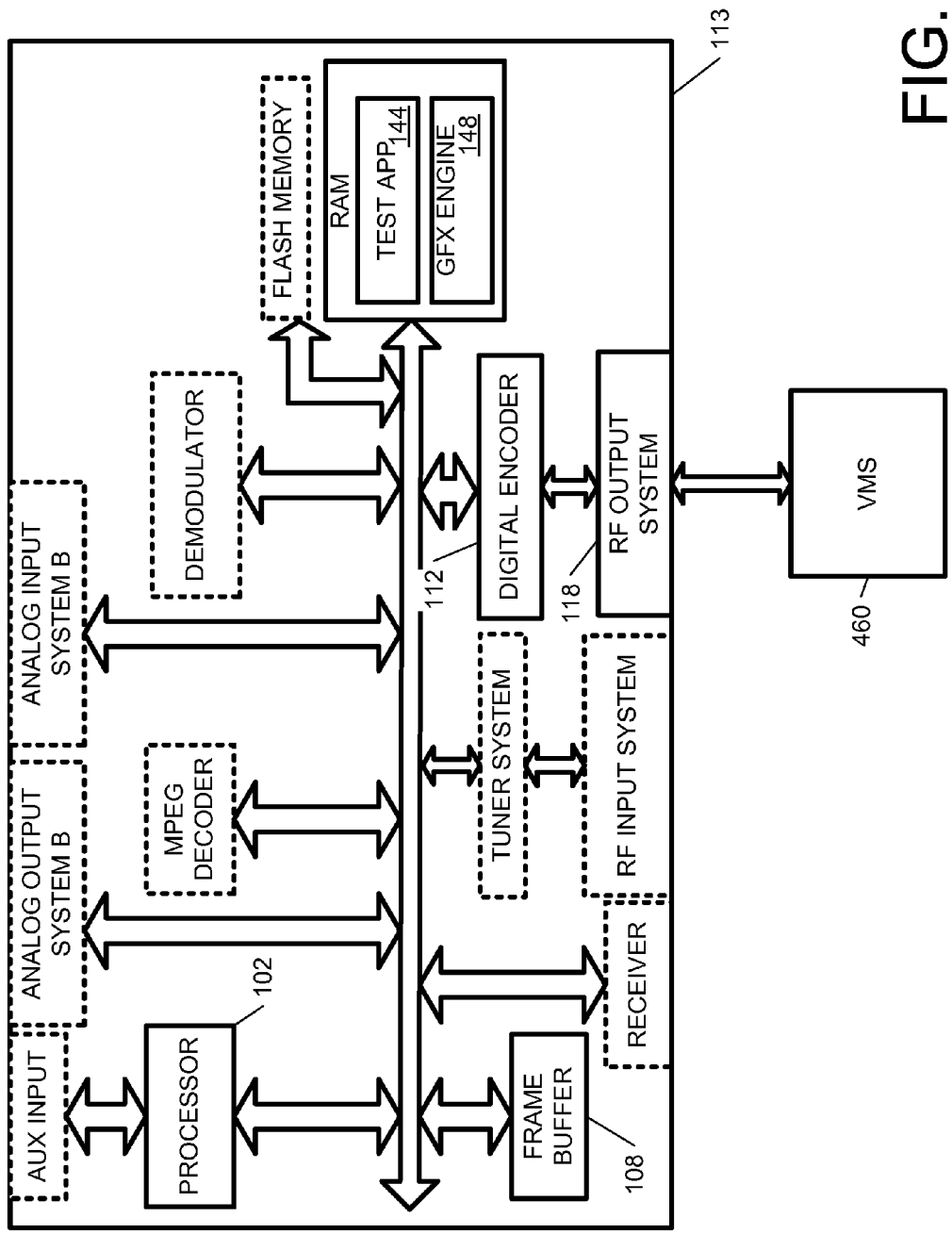
FIG. 9 is a block diagram illustrating exemplary components that may be active during an internal video test of an STT with utilization of the graphics engine, similar to the STT from FIG. 1.

FIG. 9 is a block diagram illustrating exemplary components that may be active during an internal video test of an STT with utilization of the graphics engine, similar to the STT from FIG. 1. More specifically, in this nonlimiting example, the processor 102 can instruct graphics engine 148 to send a test pattern to frame buffer 108. The frame buffer 108 can hold the test pattern and send the test pattern to digital encoder 112. Digital encoder 112 can convert the received test pattern into an analog format for testing by the VMS 460. However, using the graphics infrastructure may not test the MPEG decoder 104, which may be more complicated and prone to incorrect assembly. Conversely, the test may be useful if separate testing of the graphics infrastructure is desired.

One should note that while in some embodiments, a computing device 770 and data storage 664 are coupled to the STT 113, 213, 313, this is a nonlimiting example. More specifically, depending on the particular configuration, a computing device 770 and/or data storage 772 may be coupled to the STT 113, 213, 313, however this should not be construed to imply that such a configuration is limited to only those embodiments illustrated in this disclosure.

Figure 10:
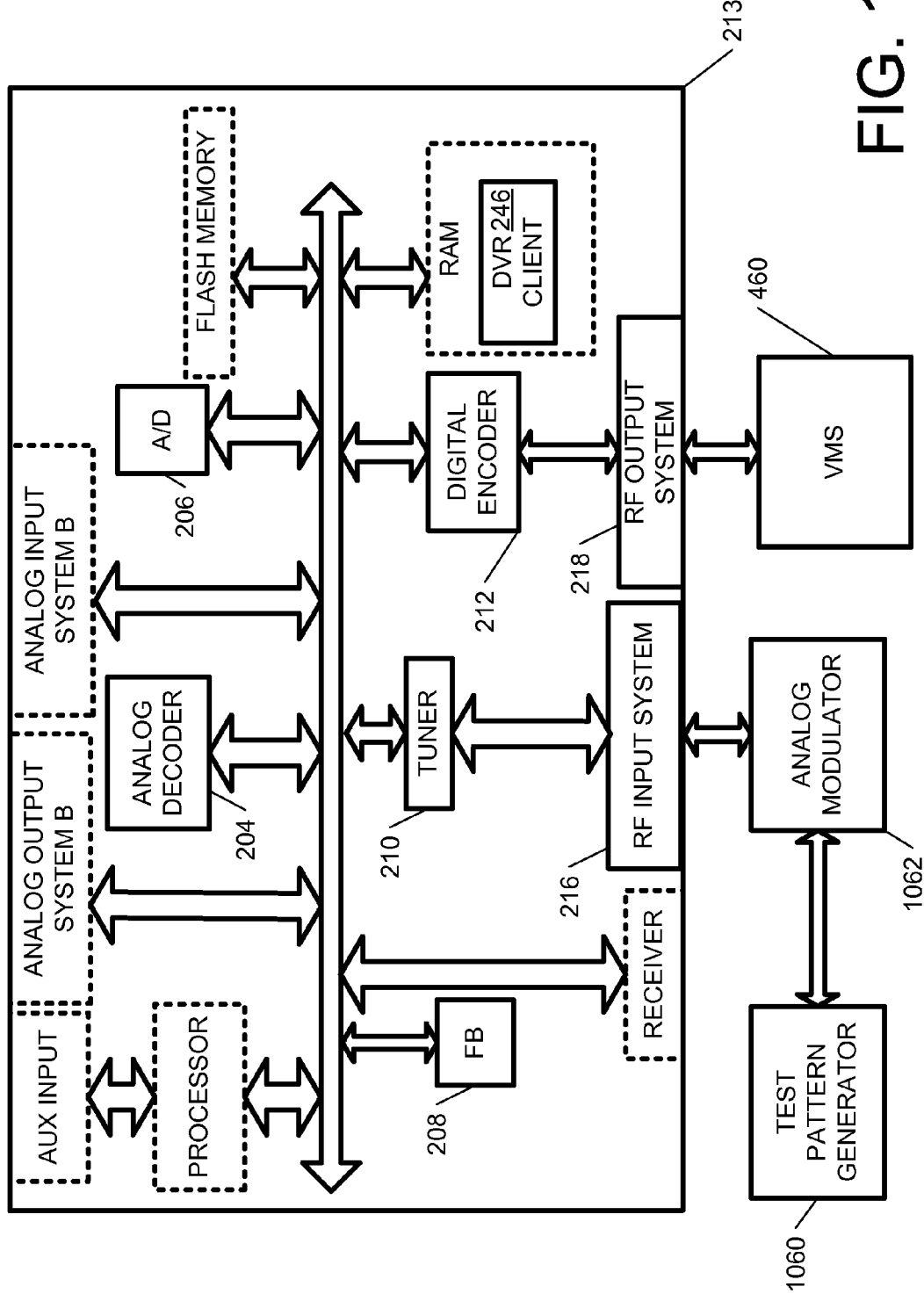
FIG. 10 is a block diagram illustrating exemplary components that may be active during a video test of the STT from FIG. 2.

FIG. 10 is a block diagram illustrating exemplary components that may be active during a video test of the STT from FIG. 2. More specifically, in such a configuration a test pattern generator 1060 may be coupled to an analog modulator 1062. The test pattern generator 1060 can be configured to generate a test pattern and send the generated test pattern to the analog modulator 1062. The analog modulator 1062 can modulate the test pattern and send the modulated test pattern to the RF input system 216. The RF input system 216 can send the test pattern to a tuner 210. The tuner 210 can tune the STT 213 to one or more channel related to the test pattern, and send the test pattern to an analog to digital converter 206. The analog to digital converter 206 can convert the received test pattern to the digital domain and send the converted test pattern to the analog decoder 204. The analog decoder 204 can digitally decode the converted analog test pattern and send the decoded test pattern to the frame buffer 208. The frame buffer 208 can send the test pattern to the digital encoder 212, which can convert the test pattern from the digital domain into analog video for the VMS 460. The digital encoder 212 can then send the converted test pattern to the VMS 460 via the RF output system 218.

As discussed above with respect to FIG. 6, while the above configuration may provide testing capabilities for the analog STT 213, the accuracy of such a configuration may be diminished due to the presence of external test equipment (e.g. test pattern generator 1060, analog modulator 1062, and/or connection devices coupling the test equipment). As the external test equipment may not operate properly, may not be configured properly, and/or may not be connected properly, the accuracy of results from the video test may suffer.

Figure 11:
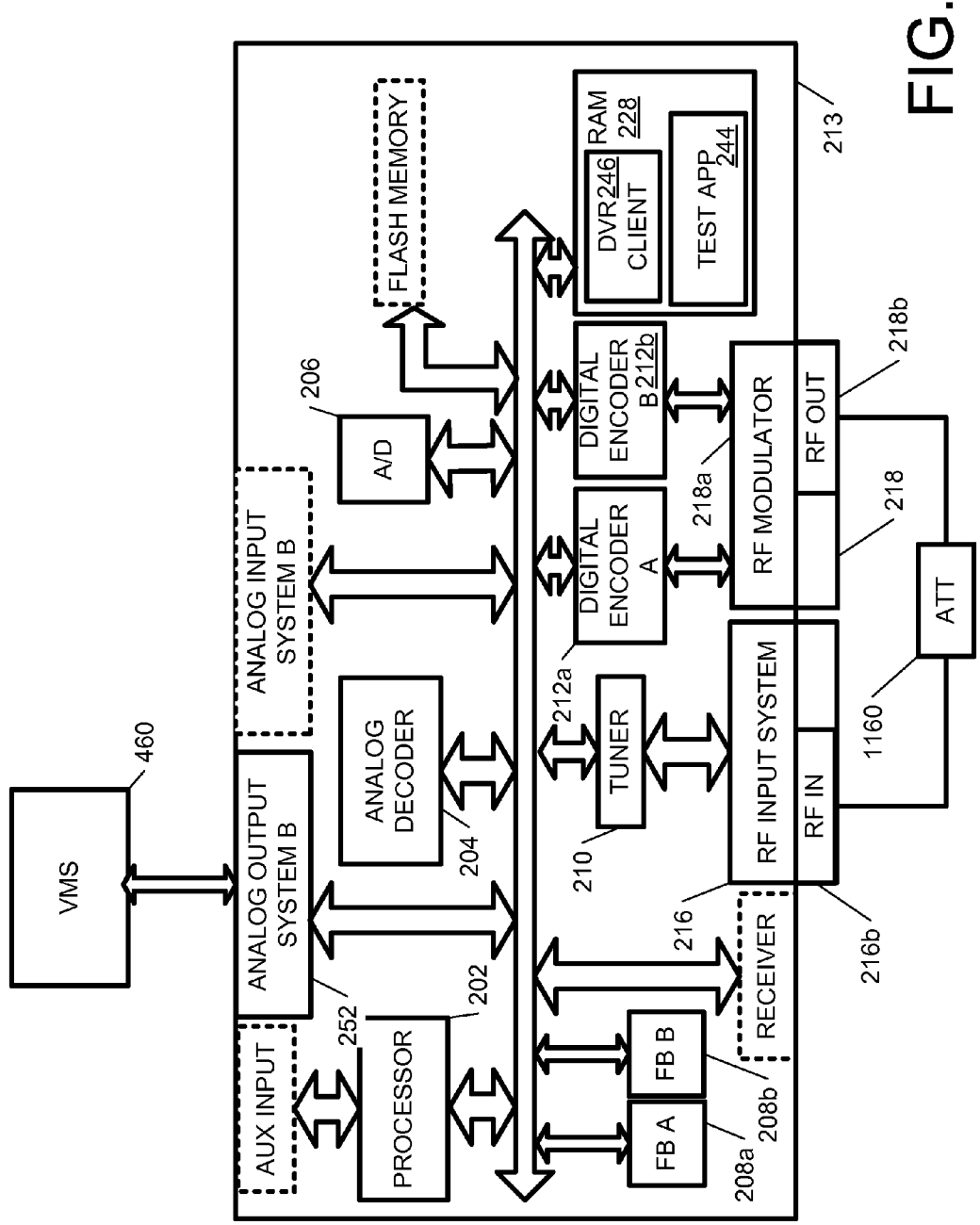
FIG. 11 is a block diagram illustrating exemplary components that may be active during an internal video test of the STT from FIG. 2.

FIG. 11 is a block diagram illustrating exemplary components that may be active during an internal video test of the STT from FIG. 2. More specifically, in the analog STT 213 of FIG. 11, the processor 202 can instruct the test pattern to be sent from test application component 244 in RAM 228 to the MPEG decoder 204. The MPEG decoder 204 can decode the received test pattern and send the decoded test pattern to the first frame buffer 208a. The first frame buffer 208a can then send the test pattern to the first digital encoder 212a. The first digital encoder 212a can convert the received test pattern into an analog video (and/or audio) signal and send the converted signal to RF modulator 218a (which may be part of RF output system 218 from FIG. 2). RF modulator 218a can modulate the received test pattern and send the modulated test pattern to attenuator 1160 via RF output port 218b (which may also be part of RF output system 218 from FIG. 2).

The attenuator 1160 can attenuate the test pattern and send the attenuated test pattern to RF input 216b, which may be part of RF input system 216. The RF input system 216 can send the received test pattern to tuner 210, which can tune the analog STT 213 to a desired channel. The attenuator is needed to vary the strength of signal being input into the RF input of the STT under test. For example, it enables testing of the video input at low signal level. One should note that this tests 100% of the analog signal path with very minimal test equipment (1 attenuator), which is hugely advantageous in a factory environment.

The tuner 210 can then send the test pattern to analog to digital converter 206. The analog to digital converter 206 can convert the analog test pattern into a digital format and send the digitized test pattern to analog decoder 204. As discussed above, the analog decoder 204 can receive and digitally decode the test pattern, and send the decoded test pattern to the second frame buffer 208b. The second frame buffer 208b can send the test pattern to the second digital encoder 212b, which can convert the digital test pattern into an analog video signal. The second digital encoder 212b can then send the test pattern to VMS 460 via second component system 252.

Figure 12:
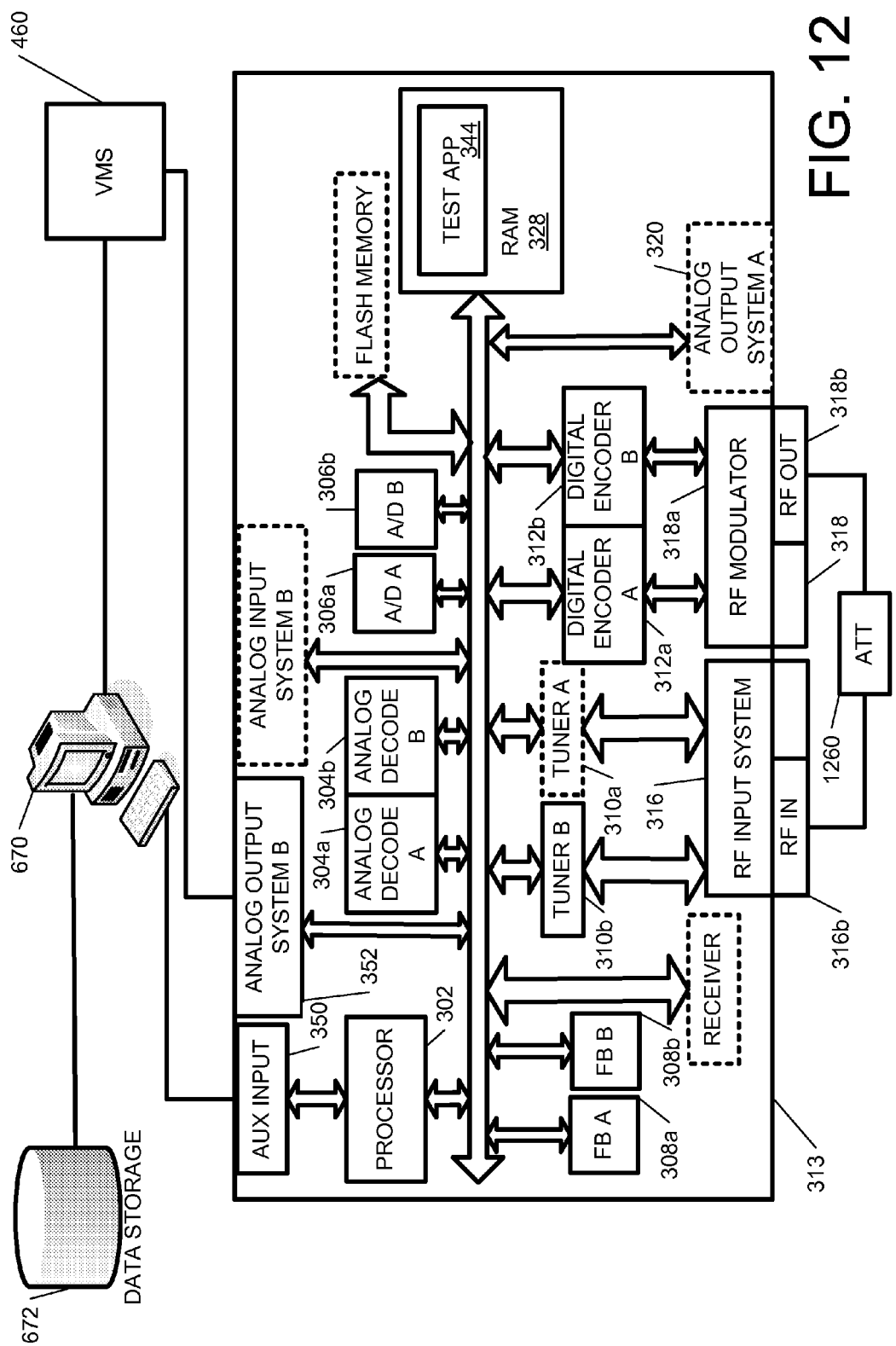
FIG. 12 is a block diagram illustrating exemplary components that may be active during an internal video test of the STT from FIG. 3.

FIG. 12 is a block diagram illustrating exemplary components that may be active during an internal video test of the STT from FIG. 3. More specifically, the computing device 670 can send a command to processor 302 for test application component 244 to send a test pattern to first digital decoder. The first digital decoder can decode the received test pattern and send the received test pattern to first frame buffer 308a. Note that the test pattern may originate from any computer-readable medium inside or connected to the STT under test. Non-limiting examples include RAM, Flash, the HDD, or an externally attached USB memory device.

The first frame buffer 308a can send the test pattern to first digital encoder 312a, which can convert the received test pattern into an analog format. The first digital encoder 312a can then send the test pattern to RF modulator 318a, which can be configured to modulate the analog signal and send the analog signal to attenuator 1160 via RF output 318b. The attenuator 1160 can attenuate the test pattern and send the attenuated test pattern to second tuner 310b via RF input port 316b. This "loopback" system enables testing of multiple video paths simultaneously. If high-quality video successfully emerges from the end of the signal chain, it is likely that the entire chain is functioning correctly. Besides doing away with a substantial amount of test equipment, testing the entire chain at once will also reduce test time.

Second tuner 310b can tune the analog STT 312 to a desired channel for the test pattern and can send the test pattern to a second analog to digital converter 306b. The second analog to digital converter 306b can convert the test pattern into a digital format and can send the converted test pattern to a second analog decoder 304b. Second analog decoder 304b can decode the test pattern and send the decoded test pattern to second frame buffer 308b. The second frame buffer 308b can send the test pattern to second digital encoder 312b. Second digital encoder 312b can convert the test pattern to an analog format and send the converted test pattern to VMS 460 via second output system 352. VMS 460 can analyze the received test pattern to determine errors in the analog STT 313. The computing device 670 can facilitate this analysis and can send data related to this analysis to data storage 672.

Additionally, if an operator desires to test the video capabilities of a different video path (e.g., one that includes first tuner 310a), the operator can configure the video test such that second digital encoder 312b is coupled to RF modulator 318a and first tuner 310a is coupled to RF input port 316b. Additionally, first digital encoder 312a is coupled to VMS 460 via first analog output system 320. As described in more detail below, running the test pattern from RAM 328 in this configuration can test other components in the analog STT 213. Additionally, some embodiments can be configured to activate a DVR client 346 to send a test pattern from the hard drive to a first analog decoder 304a, via a DVR infrastructure. Similarly, some embodiments can be configured to store test application store 330 in flash memory 326 to send a test pattern to a first analog decoder 304a.

Figure 13:
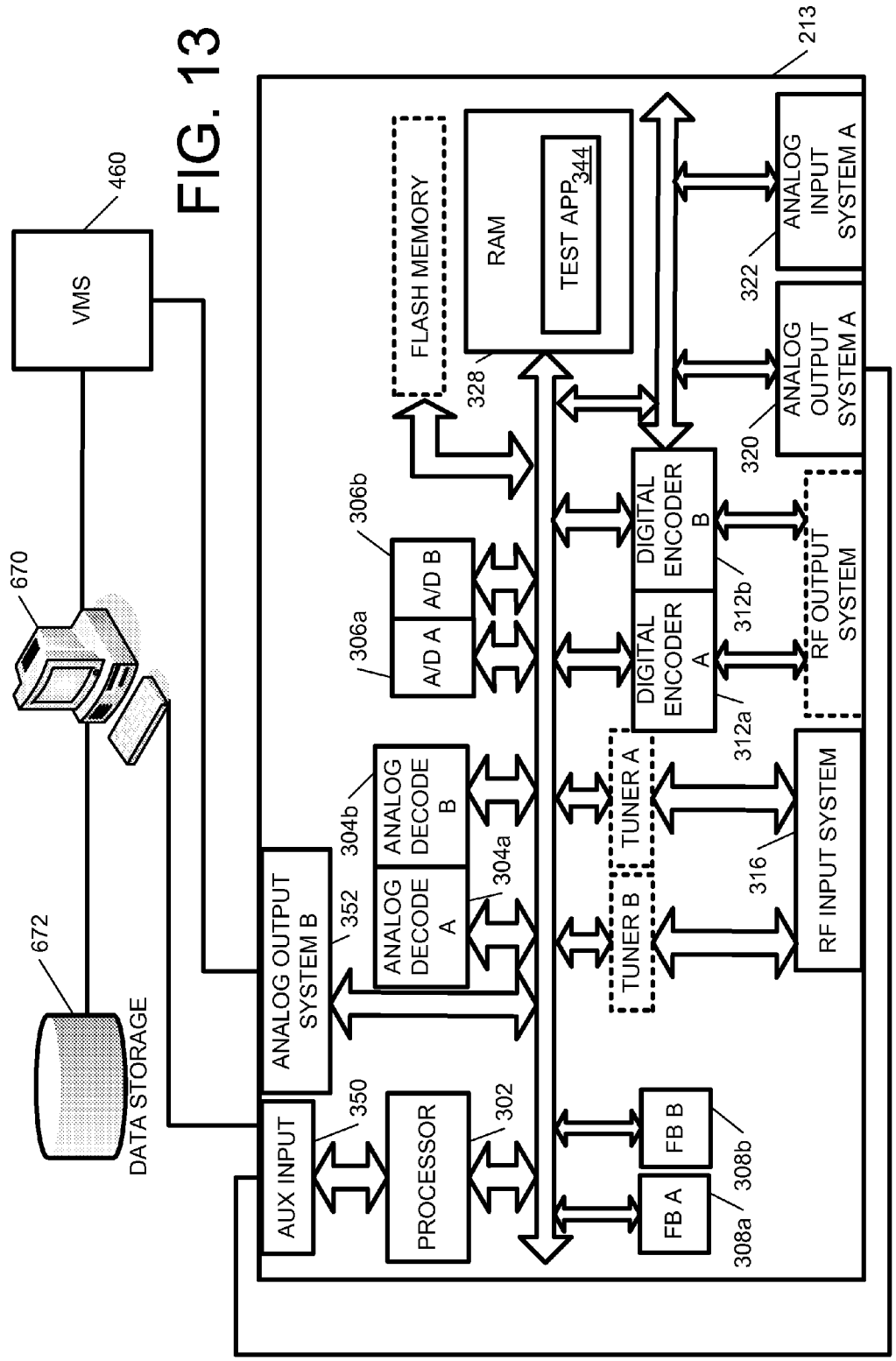
FIG. 13 is a block diagram illustrating an internal video test utilizing component video systems, similar to the STT from FIG. 3.

FIG. 13 is a block diagram illustrating an internal video test utilizing component video systems, similar to the STT from FIG. 4. More specifically, computing device 670 can facilitate communication of a test pattern from RAM 328 to first decoder 304a. First decoder 304a can decode the received test pattern and send the decoded test pattern to a first frame buffer 308a. The first frame buffer 308a can send the received test pattern to a first digital encoder 312a, which can encode the test pattern and send the encoded test pattern to a first analog output system 320. The first analog output system 320 can be coupled to a first analog input system 322, which can facilitate communication of the test pattern to a second analog to digital converter 306b. One should note that the above description provides a way, among others, to self-test an auxiliary input.

The second analog to digital converter 306b can convert the test pattern from analog to digital format and can send the test pattern to a second analog decoder 304b. The second analog decoder 304b can decode the test pattern and send the decoded test pattern to a second frame buffer 308b. The second frame buffer 308b can send the test pattern to a second digital encoder 312b, which can encode the test pattern and send the encoded test pattern to a VMS 460 via a analog output system 352. The VMS 460 can analyze the received test pattern to determine whether the analog STT 213 is operating properly. The computing device 660 can facilitate this analysis, as well as facilitate storage of the analysis at data storage 662.

Figure 14:
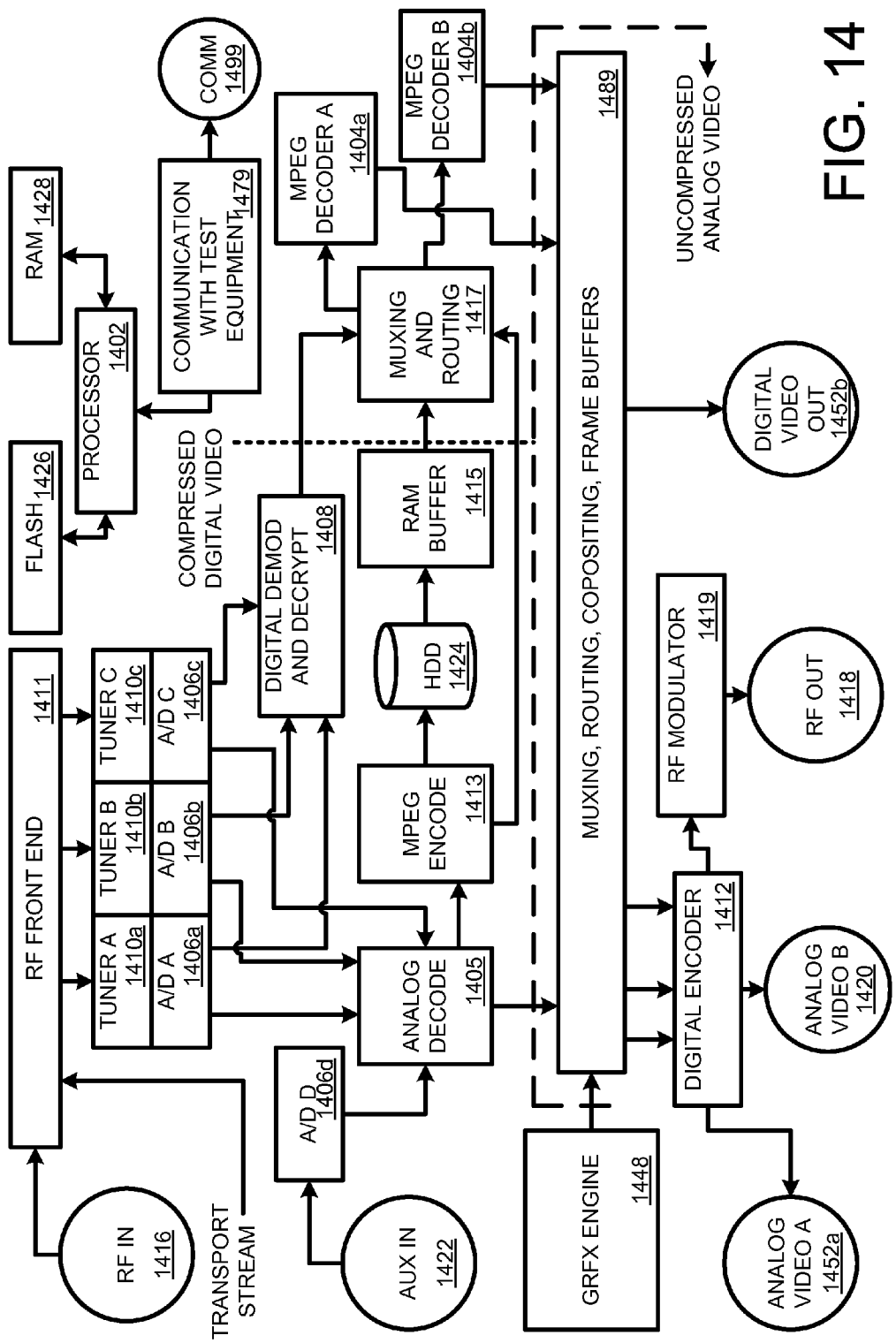
FIG. 14 is a functional flow diagram illustrating an exemplary process for testing at least one component of an STT, such as the analog STT from FIG. 3.

FIG. 14 is a functional flow diagram illustrating an exemplary process for testing at least one component of an STT, such as the analog STT from FIG. 3. More specifically, in at least one nonlimiting example, RF input 1416 can be coupled to and send data to RF front end 1411. Additionally, RF front end 1411 can receive modulated data, which may include a transport stream. RF front end 1411 can send the modulated data to one or more of tuners 1410a, 1410b, and 1410c, which can tune to a baseband frequency and send the received data to one or more of the analog to digital converters 1406a, 1406b, and 1406c. If the data in tuners 1410 includes data in the analog domain, the analog to digital converters 1406 can send analog data to analog decoder 1405, which can decode the data and send to MPEG encoder 1413. MPEG encoder 1413 can encode the data and send the encoded data to a hard drive 1424, which is coupled to RAM buffer 1415.

If the data in one or more of the tuners 1410 includes data in the digital domain, the analog to digital converters 1406 can send the digital data to digital demodulator and decryptor 1408, which can demodulate and/or decrypt the received data. Regardless of whether the data from tuners 1410 includes analog data or digital data, muxing and routing component 1417 can receive the data and route the received data to MPEG decoder A or MPEG decoder B for decoding. The decoded data can be sent to muxing, routing, compositing, frame buffers component (MRCFB) 1489. MRCFB 1489 can be configured to receive demodulated data and route the data to one or more of the outputs. Additionally MRCFB 1489 can be configured to mix graphics received from GRFX engine 1448 with video received from MPEG decoder 1404. The data from MRCFB 1489 can be sent to digital video out 1452b and/or digital encoder 1412, which can encode the received data and send to analog video A 1420a and/or analog video B 1452b.

Also included in the nonlimiting example of FIG. 14 are flash 1426, RAM 1428, processor 1402, communication with test equipment 1479, and communication 1499. In operation, a test pattern can be received at RAM buffer 1415 from flash 1426 and/or RAM 1428, or generated via processor 1402. The data can then be prepared for display, as discussed above. The communication with test equipment component 1402 can then communicate with processor 1402 to determine whether the STT is operating properly.

Figure 15:
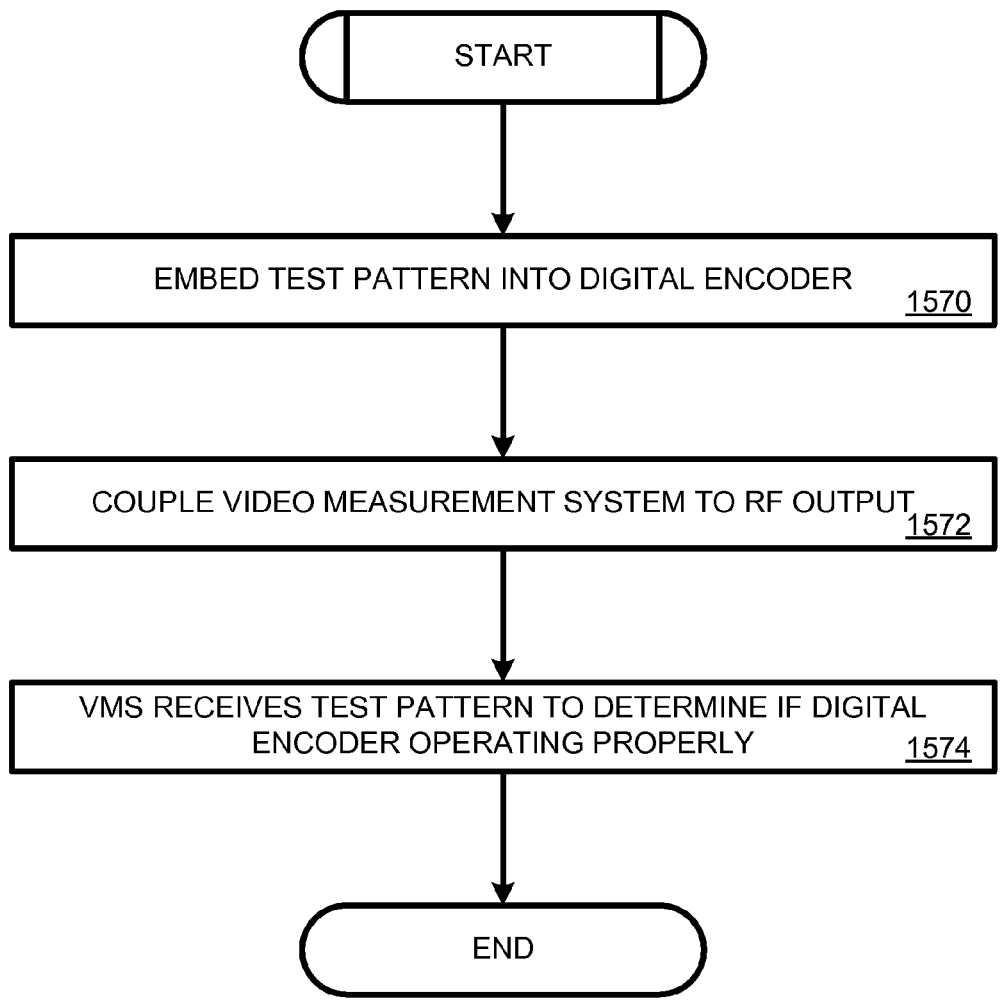
FIG. 15 is a flowchart illustrating an exemplary process used for testing a digital encoder of an STT, similar to the STT from FIG. 4.

FIG. 15 is a flowchart illustrating an exemplary process that can be used for testing a digital encoder of an STT, similar to the STT from FIG. 4. At block 1570, a test pattern is embedded into a digital encoder 112. An operator can then couple a Video Measurement System (VMS) 460 to an RF output system of digital STT 113 (block 1572). The VMS 460 can then receive the test pattern as a visual display and/or as data for analysis to determine if the digital encoder 112 is operating properly (block 1574).

As discussed above, while such a technique may provide an operator with the ability to determine whether the digital encoder 112 is operating properly, other components of the digital STT 113 are not tested. Because other components are not tested, other components also configured for displaying video may not be tested. The process can be repeated for one or more permutation of inputs, decoders, frame buffers, outputs, etc.

Figure 16A:
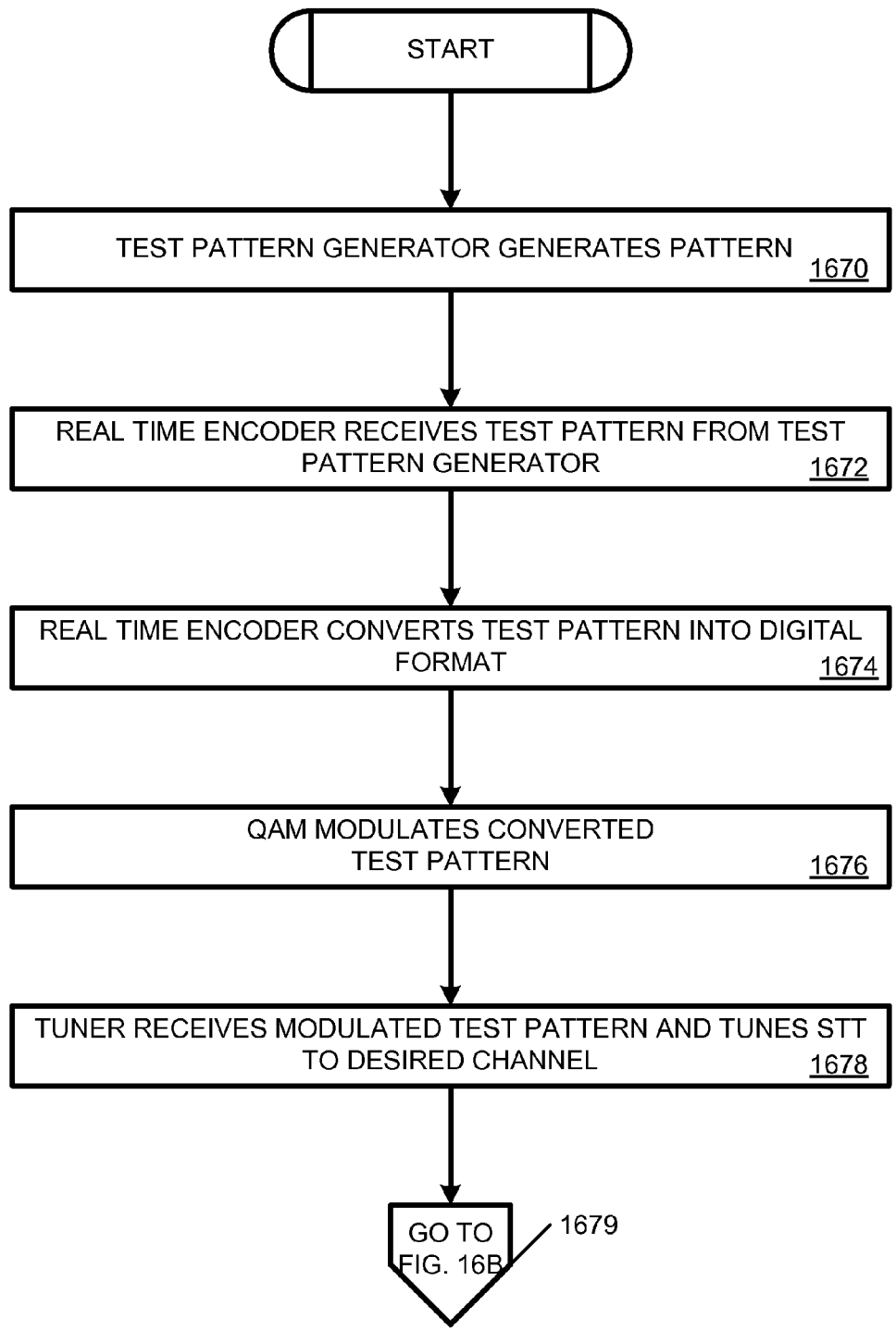
FIG. 16A is a flowchart illustrating an exemplary process used for testing a plurality of STT components, similar to the STT from FIG. 5.

FIG. 16A is a flowchart illustrating an exemplary process that can be used for testing a plurality of STT components, such as those described with respect to the STT from FIG. 5, among others. More specifically, at block 1670, a test pattern generator 564 generates a test pattern. A real time encoder 562 can then receive the test pattern from the test pattern generator 664 (block 1672). The real time encoder 562 can convert the test pattern into a digital format (block 1674) and send the converted test pattern to a QAM 560. The QAM modulates the converted test pattern (block 1676) and sends the modulated test pattern to a tuner 110. The tuner 110 receives the modulated test pattern and tunes the digital STT 113 to a desired channel (block 1678). The flowchart can then proceed to jump block 1679, which is continued in FIG. 16B.

Figure 16B:
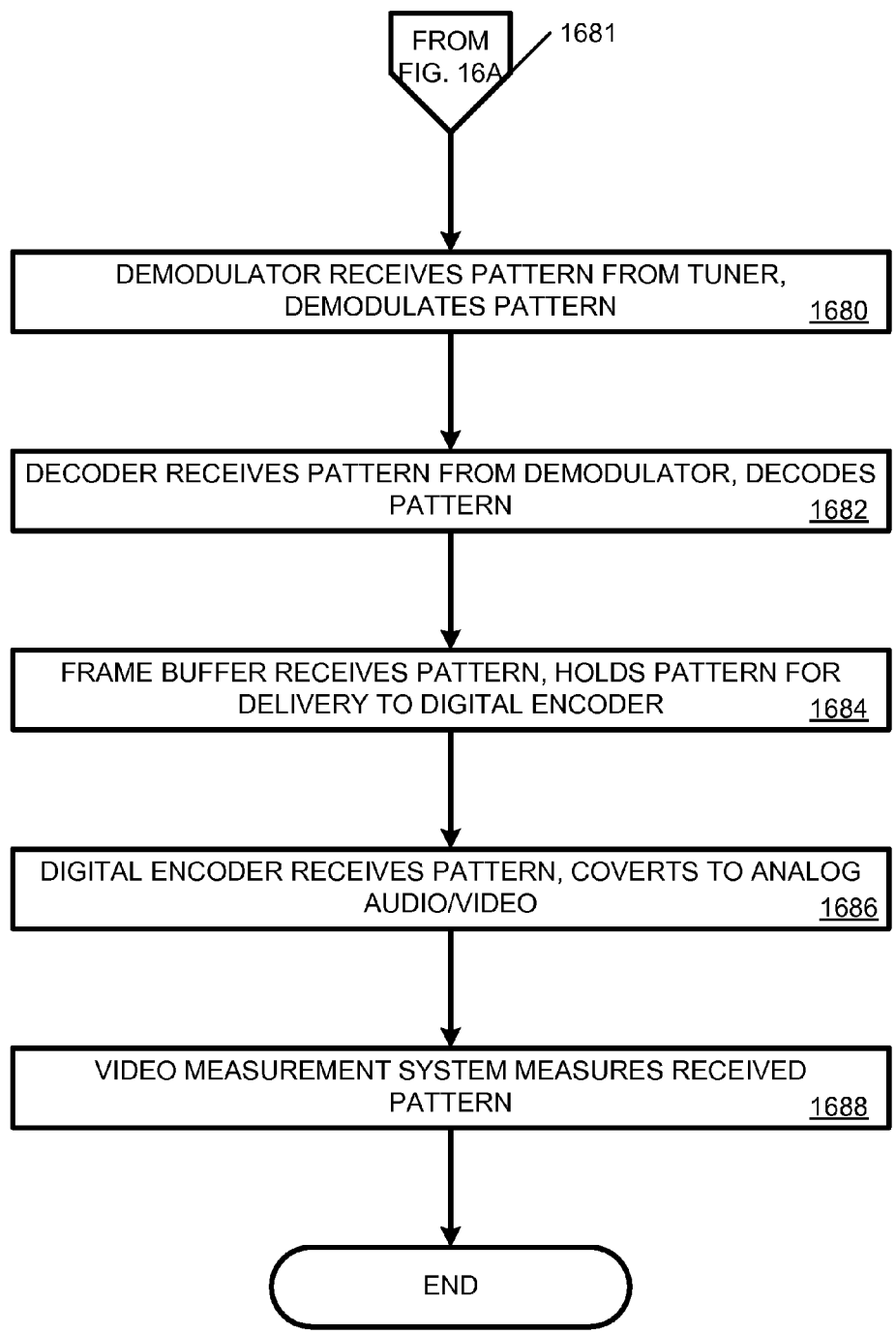
FIG. 16B is a continuation of the flowchart from FIG. 16A.

FIG. 16B is a continuation of the flowchart from FIG. 16A. From jump block 1679, jump block 1681 proceeds to block 1680, where a demodulator 106 receives the test pattern from the tuner 110 and demodulates the test pattern (block 1680). A decoder 104 receives the test pattern from the demodulator 106 and decodes the test pattern (block 1682). A frame buffer 108 then receives the decoded test pattern and holds the test pattern for delivery to a digital encoder 112 (block 1684). The digital encoder 112 receives the test pattern and converts the received test pattern into an analog video signal (and/or audio signal), as shown in block 1686. A VMS 460 can then receive and measure the converted test pattern (block 1688).

Figure 17:
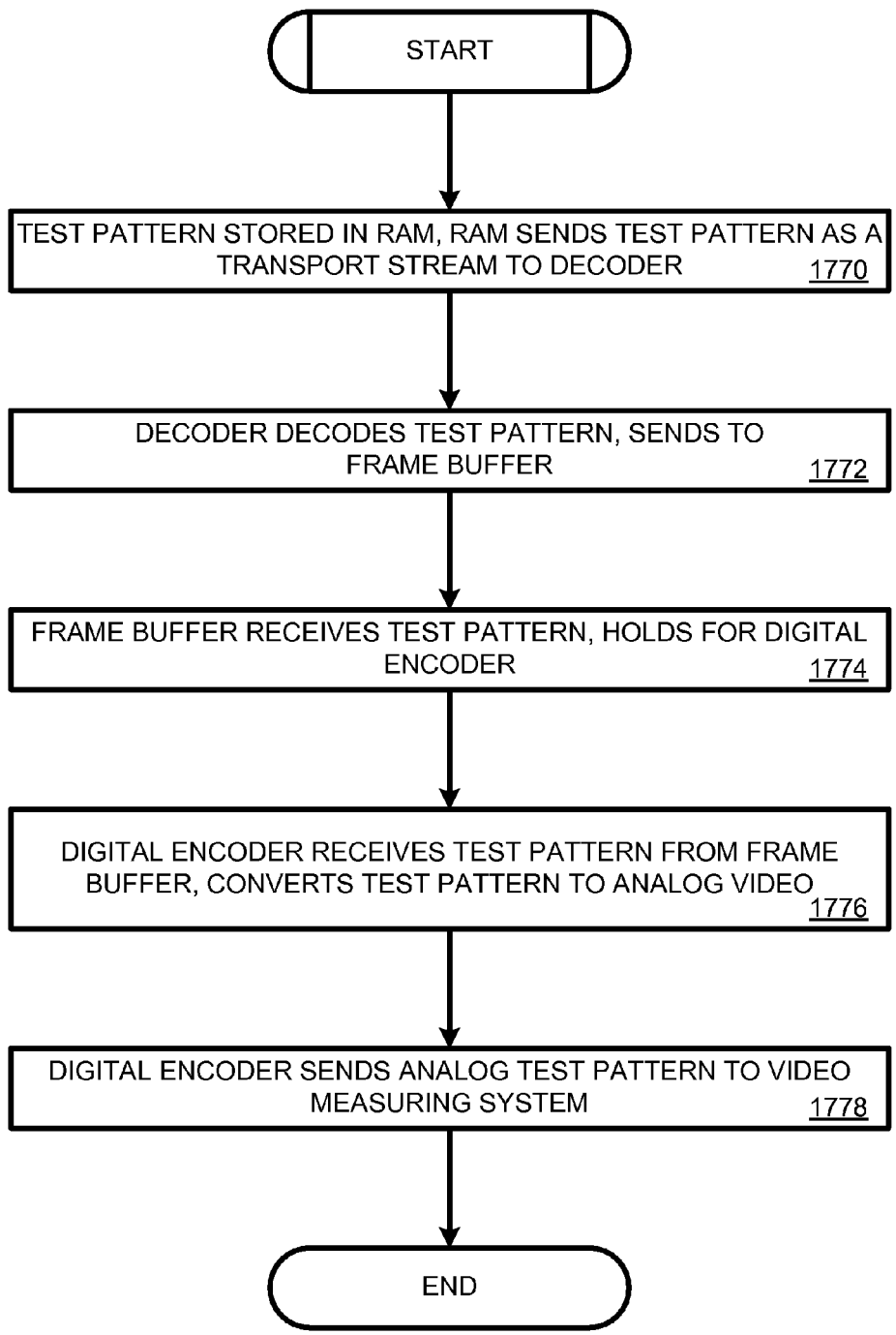
FIG. 17 is a flowchart illustrating an exemplary process used for an internal video test of an STT, such as the STT from FIG. 6.

FIG. 17 is a flowchart illustrating an exemplary process used for an internal video test of an STT, such as the STT from FIG. 6. More specifically, at block 1770, a test pattern is stored in RAM 228. RAM 228 can send the test pattern as a transport stream to a decoder, such as MPEG decoder 428. The decoder 428 can decode the received test pattern and send the decoded test pattern to a frame buffer 208 (block 1772). The frame buffer 208 receives the test pattern and holds the test pattern for a digital encoder 212 (block 1774). The digital encoder 212 receives the test pattern from the frame buffer and converts the test pattern into an analog video (and/or audio) signal (block 1776). The digital encoder can then send the analog video (and/or audio) signal to a VMS 460 (block 1778).

One should note that while block 1770 illustrates that the test pattern is stored in Ram 228, this is a nonlimiting example. More specifically, as discussed therein, a test pattern can be stored in any volatile and/or nonvolatile memory component, including but not limited a DVR storage device, hard drive, etc. Additionally, as discussed below, a test pattern can be generated for testing one or more components of an STT.

Figure 18:
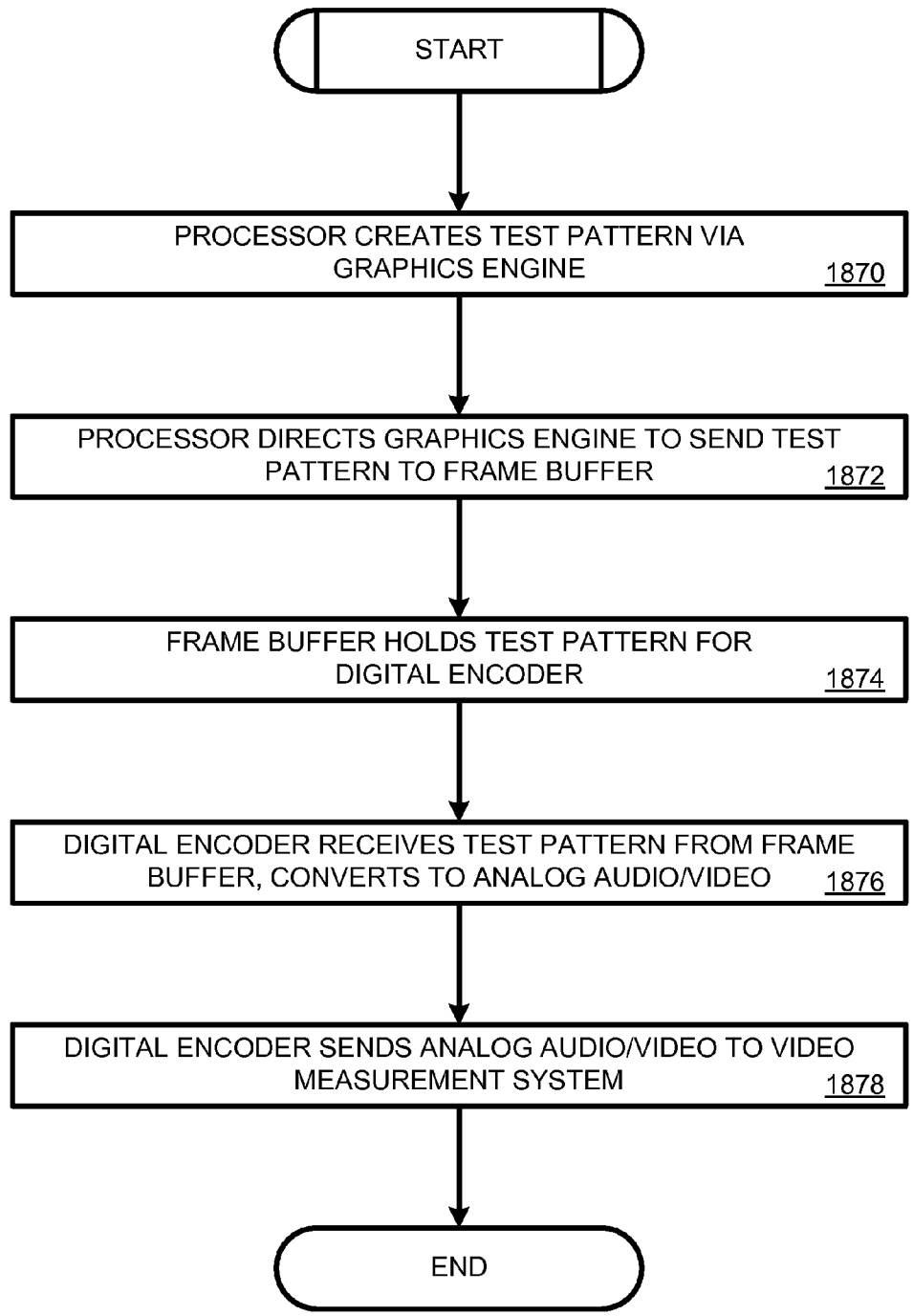
FIG. 18 is a flowchart illustrating an exemplary process used for an internal video test of an STT via utilization of a graphics engine, similar to the STT from FIG. 9.

FIG. 18 is a flowchart illustrating an exemplary process used for an internal video test of an STT via utilization of a graphics engine, similar to the STT from FIG. 9. More specifically, at block 1870, a processor 102 can create a test pattern via graphics engine. The processor 102 can then direct a graphics engine 148 to send the test pattern to a frame buffer 108 (block 1872). Upon receiving the test pattern, the frame buffer 108 can hold the test pattern for the digital encoder 112 (block 274). The digital encoder 112 can receive the test pattern from the frame buffer 108 and can convert the test to analog video (and/or audio), as illustrated in block 1876. The digital encoder 112 can then send the analog video (and/or audio) to a VMS 460 (block 1878).

Figure 19:
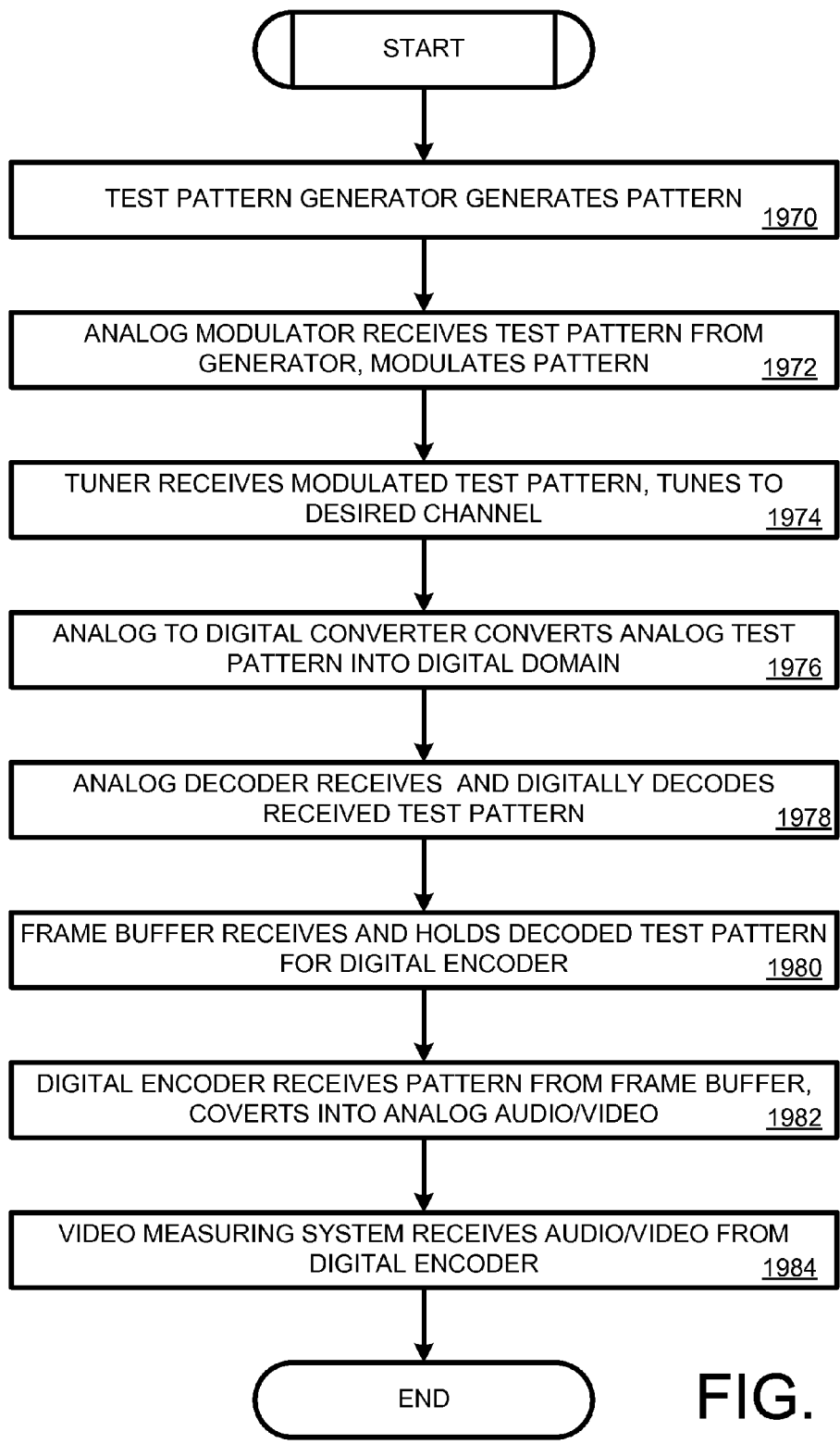
FIG. 19 is a flowchart illustrating an exemplary process used for a video test of an analog STT, similar to the STT from FIG. 10.

FIG. 19 is a flowchart illustrating an exemplary process used for a video test of an analog STT, similar to the STT from FIG. 10. More specifically, at block 1970, a test pattern generator 1060 can generate a test pattern. An analog modulator 1062 can receive the test pattern from the generator 1060. Upon receiving the test pattern, the analog modulator 1062 can modulate the test pattern (block 1972). A tuner 210 can then receive the modulated test pattern and tune the analog STT 213 to a desired channel (block 1974). An analog to digital converter 206 can receive the test pattern and convert the analog test pattern into the digital domain (block 1976). An analog decoder 204 can then receive the test pattern and digitally decode the received test pattern (block 1978).

A frame buffer 208 can receive and hold the decoded test pattern for a digital encoder 212 (block 1980). The digital encoder 212 can then receive the test pattern from the frame buffer 208, and convert the test pattern into an analog video and/or audio signal (block 1980). A VMS 460 can then receive the video (and/or audio) from the digital encoder 212 (block 1982).

Figure 20A:
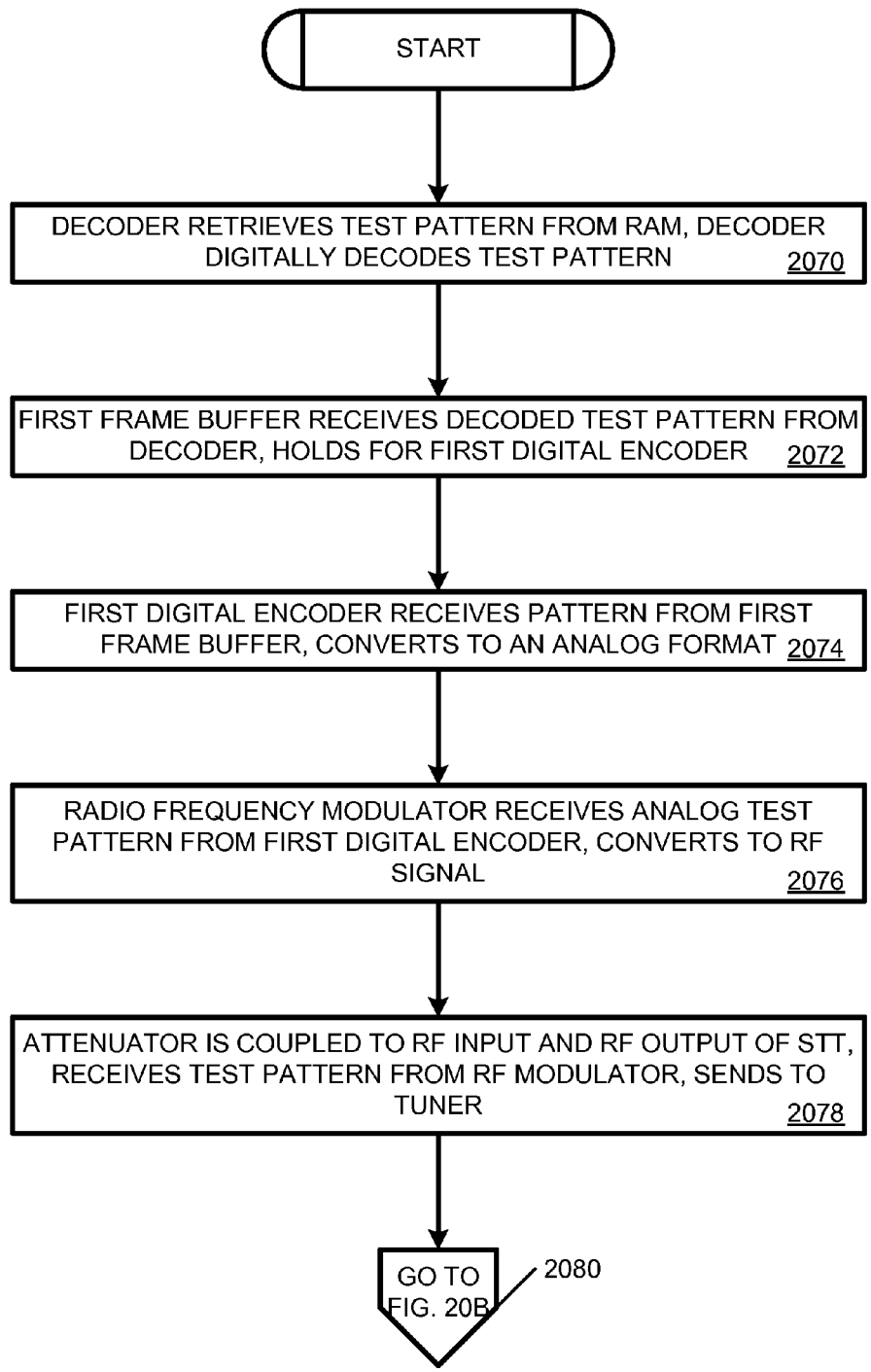
FIG. 20A is a flowchart illustrating an exemplary process used for an internal video test of an analog STT, similar to the STT from FIG. 11.

FIG. 20A is a flowchart illustrating an exemplary process used for an internal video test of an analog STT, similar to the STT from FIG. 11. More specifically, at block 2070, a decoder 204 retrieves a test pattern from RAM 228. Additionally, the decoder 204 can digitally decode the retrieved test pattern (block 2070). A first frame buffer 208a can receive the decoded test pattern from the decoder 204 and can hold the test pattern for a first digital encoder 212a (block 2072). The first digital encoder 212a can then receive the test pattern from the first frame buffer 208a and convert the received test pattern to an analog format (block 2074). A Radio Frequency (RF) modulator 218a can receive the analog test pattern from the first digital encoder 212a. The RF modulator 218a can then convert the test pattern into an RF signal (block 2076). An attenuator 1160 that is coupled to an RF input 216b and the RF output 218b can receive the test pattern from the RF modulator 218a (via the attenuator 1260), and sends the test pattern to the tuner 210 (block 2078). The flowchart can then proceed to FIG. 20B via jump block 2080.

Figure 20B:
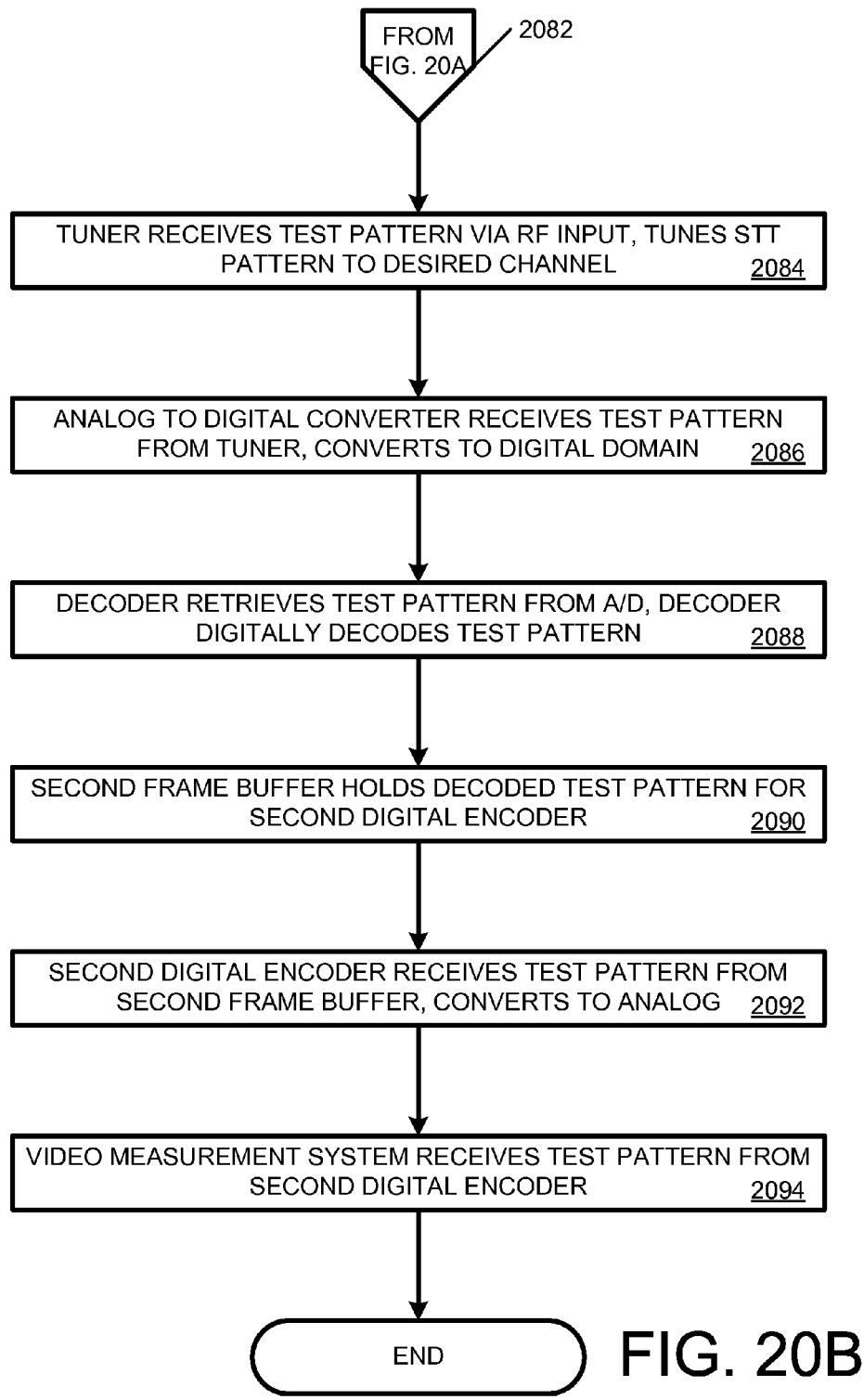
FIG. 20B is a continuation of the flowchart from FIG. 19A.
Figure 21A:
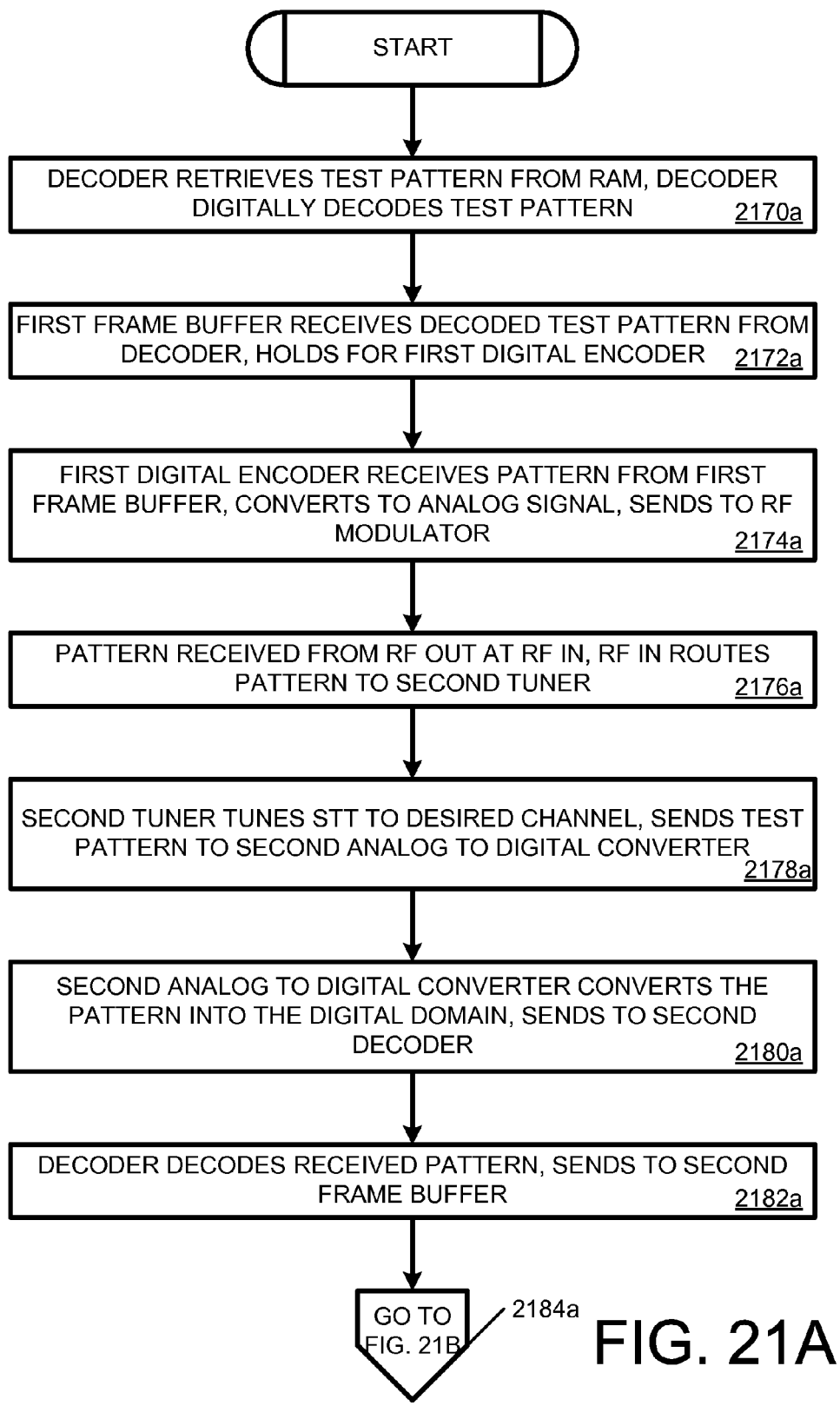
FIG. 21A is a flowchart illustrating an exemplary process used for an internal video test of an analog STT with a plurality of tuners, similar to the STT from FIG. 12.
Figure 21B:
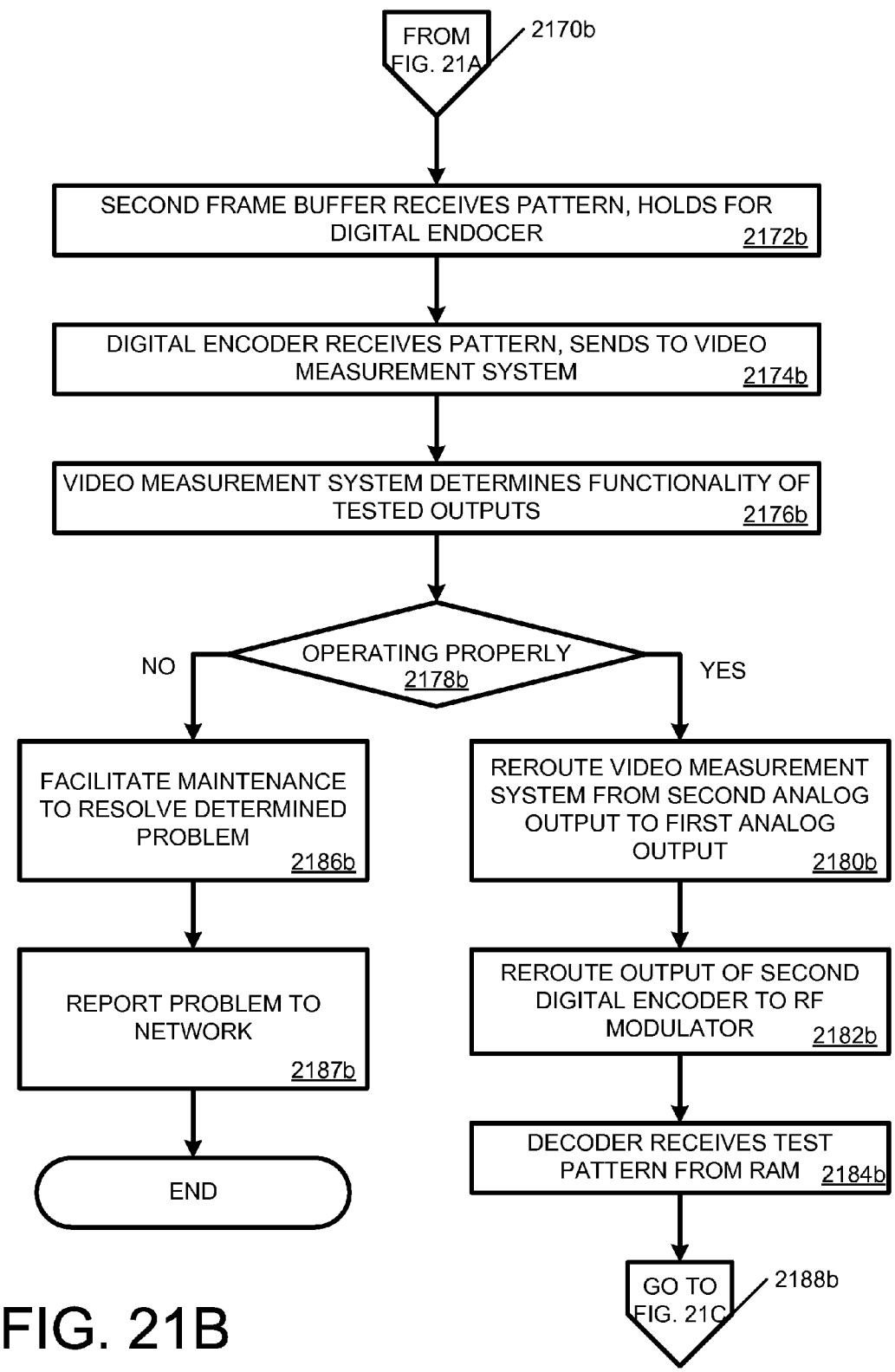
FIG. 21B is a continuation of the flowchart from FIG. 20A.

FIG. 20B is a continuation of the flowchart from FIG. 20A. More specifically, from jump block 2082, the tuner 210 receives the test pattern via an RF input 216b and tunes analog STT 213 to a desired channel (block 2084). An analog to digital converter 206 can receive the test pattern from the tuner and convert to the test pattern to the digital domain (block 2086). A decoder 204 can retrieve the test pattern from the analog to digital converter 206 and decode the retrieved test pattern (block 2088). A second frame buffer 208b can then receive the test pattern from the decoder and hold the decoded test pattern for a second digital encoder 112b (block 2090). The second digital encoder 112b receives the test pattern from the second frame buffer 108b and converts the test pattern into an analog format (block 2092). A VMS 460 can then receive the test pattern from the second digital encoder 112b for analysis of the operation of the analog STT 213 (block 2094).

FIG. 20A is a flowchart illustrating an exemplary process used for an internal video test of an analog STT with a plurality of tuners, similar to the STT from FIG. 12. More specifically, at block 2070a, a decoder 304a can retrieve a test pattern from RAM 328. The decoder 304a can then digitally decode the retrieved test pattern (block 2070a). A first frame buffer 108a can receive the decoded test pattern from the decoder 304a and hold the test pattern for a first digital encoder 112a (block 2072a). The first digital encoder 112a receives the test pattern from the first frame buffer and converts the test pattern into an analog signal. The first digital encoder 112 can then send the test pattern to an RF modulator 418b (block 2074a). The test pattern can be communicated to an RF output 318b, to an attenuator 1160, and then to an RF input 316b. The RF input can then route the test pattern to a second tuner 310b (block 2076a). The second tuner 310b can tune the analog STT 213 to a desired channel and send the test pattern to a second analog to digital converter 306b (block 2078a). The second analog to digital converter 306b can convert the received test pattern into the digital domain and send the converted test pattern to a second decoder 304b (block 2080a). The second decoder 304b can then decode the received pattern and send the test pattern to a second frame buffer 308b (block 2082a). The flowchart can then proceed to jump block 2084a.

FIG. 20B is a continuation of the flowchart from FIG. 20A. More specifically, from jump block 2070b, the flowchart continues where the second frame buffer 308b receives the test pattern and holds the test pattern for a second digital encoder 312b (block 2072b). The second digital encoder 112b can then receive the test pattern, encode the test pattern and send the encoded test pattern to a VMS 460 (block 2074b). From the quality of the received test pattern (and a knowledge of the original test pattern), the VMS 460 can determine the functionality of the tested components (block 2076b). If the VMS 460 determines that the test components are not operating properly (block 2078b), the VMS 460 can facilitate maintenance to resolve the determined problem (block 2086b). The VMS 460 can then report the problems detected to the computing device 670 and/or data storage 672.

If, on the other hand, the VMS 460 determines that the tested components are operating properly, an operator can reroute the VMS 460 to be coupled to the second analog output 452 to the first analog output 320 (block 2080b). The operator can then reroute the output of the second digital encoder 112b to the RF modulator 318a (block 2082b). This new configuration can facilitate testing of STT components associated with the first tuner 310a. As such, the second decoder can then receive the test pattern from RAM 328 (block 2084b). The flowchart can then proceed to jump block 2088b.

FIG. 20C is a continuation of the flowchart from FIG. 20B. At jump block 2070c, the second decoder 304b can then decode the test pattern and send the decoded test pattern to the second frame buffer 308b (block 2072c). The second frame buffer 308b can then hold the test pattern for a second digital encoder 312b (block 2074c). The second digital encoder 312b can then convert the test pattern to an analog signal and send the converted test pattern to the RF modulator 318a (block 2076c). The RF modulator can then modulate the test pattern and send the modulated test pattern to an RF input 316b via an RF output 318b (block 2078c). From the RF input the test pattern is sent to a first tuner 310a, which tunes the analog STT to a desired channel. The tuner can then send the test pattern to a second analog to digital converter, which can be configured to convert the received test pattern into the digital domain (block 2080c). An first analog decoder 304a can receive and decode the received test pattern (block 2082c). A first frame buffer 308a can then receive the test pattern and hold the received test pattern for a first digital encoder 312a (block 2084c). The first digital encoder 312a can receive the test pattern and send the test pattern to the VMS 460 (block 2084c).

One should note that although this flowchart is illustrated as ending at block 2084c in at least one embodiment, further processing of the received data can occur. More specifically, referring to FIG. 20B (beginning at block 2078b), any of a plurality of steps may be performed to facilitate determining, documenting, and removing problems with the STT. Similar steps can also be provided to other flowcharts in this disclosure. Additionally, while FIGS. 20A, 20B, and 20C illustrated as including steps to facilitate maintenance and reporting of a determined error, this is a nonlimiting example. More specifically, any or all of the flowcharts discussed herein may include one or more of these steps.

Figure 22:
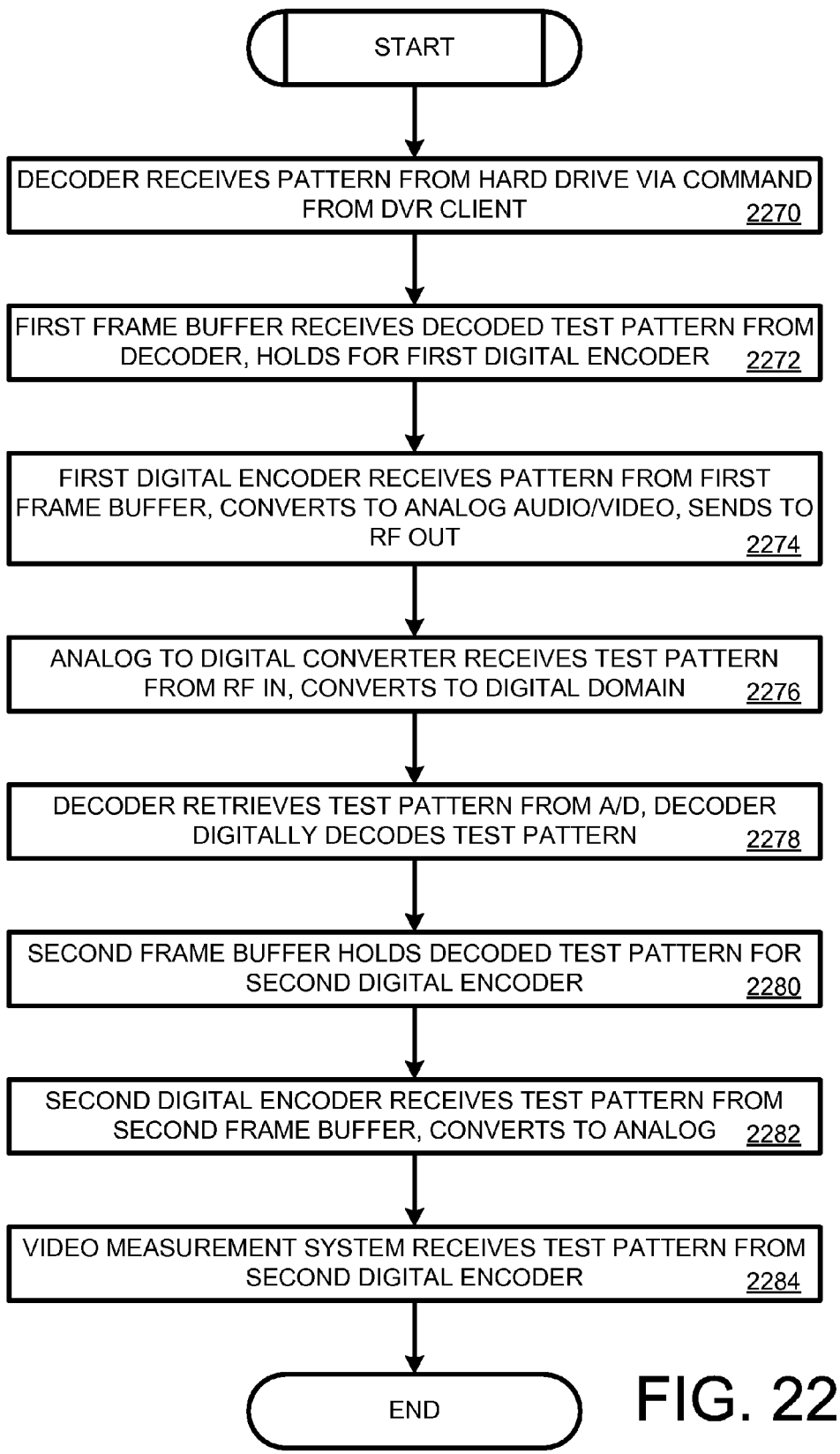
FIG. 22 is a flowchart illustrating an exemplary process used for an internal video test of an analog STT utilizing DVR playback infrastructure, similar to the STT from FIG. 12.

FIG. 22 is a flowchart illustrating an exemplary process used for an internal video test of an analog STT utilizing DVR playback infrastructure, similar to the STT from FIG. 13. More specifically, at block 2270, a first decoder 304a to receive a test pattern from a hard drive 324 via a command from a DVR client 346 and decodes the received test pattern. A first frame buffer 308a can then receive the decoded test pattern and hold the test pattern for a first digital encoder 312a (block 2272). The first digital encoder 312a can then receive the test pattern from the first frame buffer 308a. The first digital encoder 312a can then convert the test pattern to analog video (and/or audio) and send the converted test pattern to an RF modulator 318a to be output to an RF output 318b (block 2274). A second tuner 310b can receive the test pattern and tune the analog STT to a desired channel. A second analog to digital converter 4306b can then receive test pattern from the second tuner 314b and convert the test pattern to the digital domain (block 2276). The second decoder 304 can then retrieve the test pattern from the second analog to digital converter 306b and decode the retrieved test pattern (block 2278). A second frame buffer 308b can receive the decoded test pattern and hold the received test pattern for a second digital encoder 312b (block 2280). The second digital encoder 312b can then receive the test pattern from the second frame buffer 308b and convert the test pattern to an analog signal (block 2282). A VMS 460 can then receive the test pattern from the second digital encoder 312b for analysis of the STT (block 2284).

Figure 23:
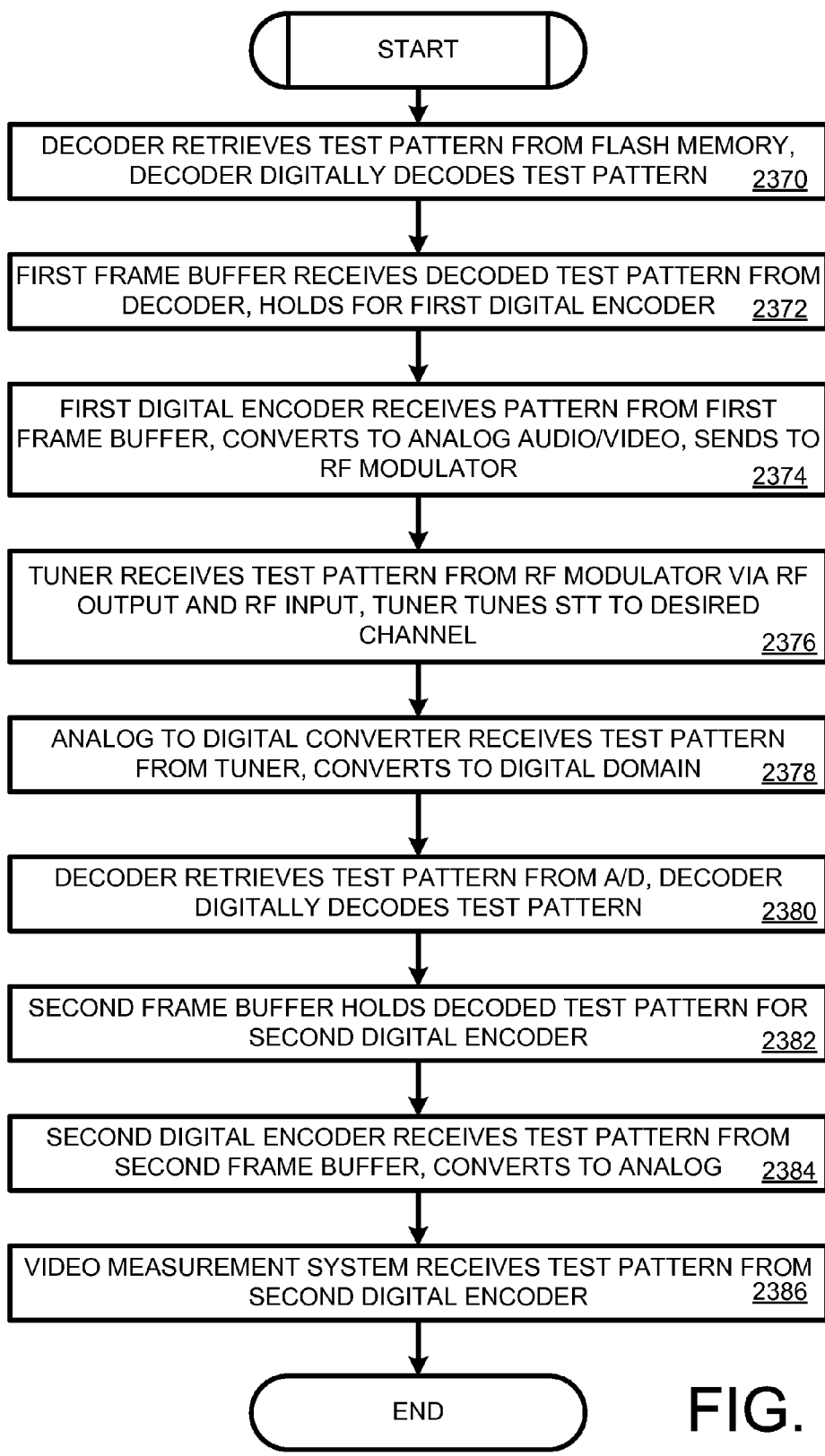
FIG. 23 is a flowchart illustrating an exemplary process used for an internal video test of an analog STT utilizing flash memory, similar to the STT from FIG. 12.

FIG. 23 is a flowchart illustrating an exemplary process used for an internal video test of an analog STT utilizing flash memory, similar to the STT from FIG. 15. At block 2370, a first decoder 304a can retrieve a test pattern from flash memory 326 and digitally decode the test pattern. A first frame buffer 308a can then receive the decoded test pattern from the first decoder 304a and hold the test pattern for a first digital encoder 312a (block 2372). The first digital encoder 312a can then receive the test pattern from the first frame buffer and convert the test pattern to an analog video and/or audio signal. The first digital encoder 312a can then send the test pattern to an RF modulator for modulation, which can then send the test pattern to an RF output port (block 2374).

A second tuner 310b can then receive the test pattern via an RF input system 316a and can tune the analog STT to a desired channel (block 2376). A second analog to digital converter 304b can then receive the test pattern from the tuner 310b and convert the test pattern to the digital domain (block 2378). A second decoder can retrieve the test pattern from the second analog to digital converter 306a and digitally decode the retrieved test pattern (block 2380). A second frame buffer 308b can receive the decoded test pattern and hold the test pattern for a second digital encoder 312b (block 2382). The second digital encoder 312b receives the test pattern from the second frame buffer 308b, and converts the received test pattern to analog (block 2384). A VMS 360 can then receive the test pattern from the second digital encoder 312b for analysis (block 2386).

Figure 24:
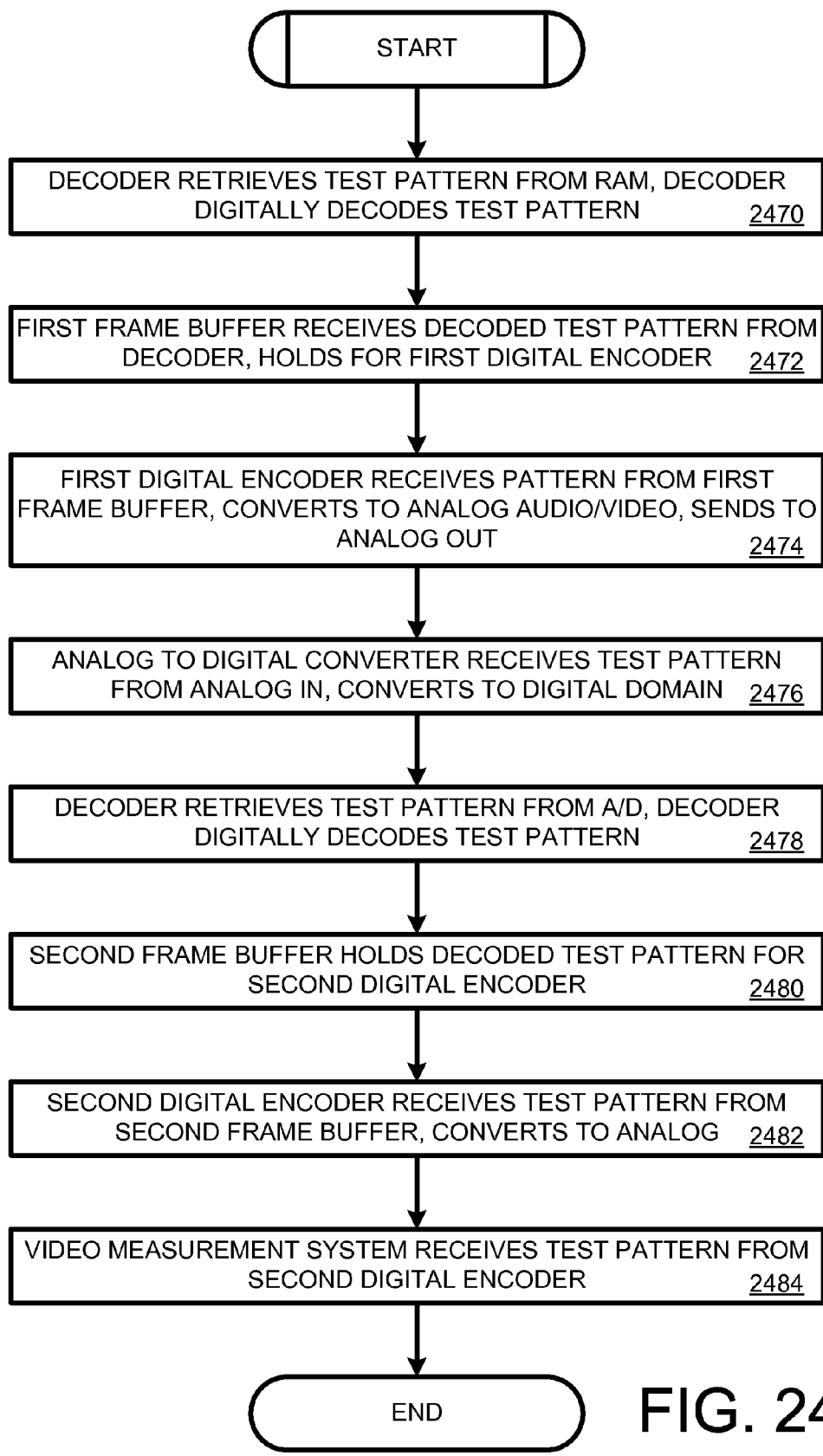
FIG. 24 is flowchart illustrating an exemplary process used for an internal video test of an analog STT via utilization of auxiliary inputs, similar to the STT from FIG. 12.

FIG. 24 is flowchart illustrating an exemplary process used for an internal video test of an analog STT via utilization of auxiliary inputs, similar to the STT from FIG. 15. More specifically, at block 2470, a first decoder 304a can retrieve a test pattern from RAM 328 and to digitally decode the retrieved test pattern (block 2470). A first frame buffer 308a can then receive the decoded test pattern from the first decoder 304a and hold the test pattern for a first digital encoder 312a (block 2472). The first digital encoder 312a can then receive the test pattern from the first frame buffer 308a and convert the test pattern of an analog video and/or audio signal. The first digital encoder 312a can then send the test pattern to a first analog output 320 (block 2474).

A second analog to digital converter 306b receives the test pattern from the auxiliary output via a connected auxiliary input 322 and converts the received test pattern to the digital domain (block 2476). A second decoder 304b can then retrieve the test pattern from the second analog to digital converter 306b and decode the retrieved test pattern (block 2478). A second frame buffer 308b can then receive and hold the decoded test pattern for a second digital encoder 312b (block 2480). The second digital encoder 312b can then receive the test pattern from the second frame buffer 308b, and convert the test pattern to an analog signal (block 2482). A VMS 460 can then receive the test pattern from the second digital encoder 312b for analysis (block 2484).

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order or not at all, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Therefore, at least the following is claimed:

1. A method for performing a functionality test on a Set Top Terminal (STT), comprising:
   storing at least one test pattern to a storage device within the STT;
   decoding the at least one test pattern stored to the storage device to produce a decoded test pattern within the STT;
   converting the decoded test pattern to an analog signal that represents the decoded test pattern;
   coupling the analog signal from an analog output port of the STT to an attenuator element that is coupled to an analog input port of the STT, the analog input port being coupled to at least one tuning device;
   the at least one tuning device tuning the STT to a radio frequency (RF) channel according to the decoded test pattern represented by the analog signal; and
   testing functionality of one or more components of the STT based on signals derived from the analog signal.

2. The method of claim 1, and further comprising converting the decoded test pattern represented in analog format in the analog signal to a digital test pattern.

3. The method of claim 2, and further comprising converting the digital test pattern to an analog video signal.

4. The method of claim 3, wherein testing comprises determining whether at least one component of the STT is operating properly based on the analog video signal.

5. The method of claim 4, wherein testing comprises sending the analog video signal that represents the converted digital test pattern to a video measurement system (VMS).

6. The method of claim 1, and further comprising modulating the analog signal that represents the decoded test pattern to an RF signal prior to coupling the analog signal via the analog output port to the attenuator element.

7. The method of claim 1, wherein the analog output port and the analog input port are at least one of the following: composite video baseband signal (CVBS), S-Video, Y/Pr/Pb Component Video, and Red Green Blue (RGB) Component Video.

8. The method of claim 1, wherein the analog output port and the analog input port are configured to convey RF modulated signals.

9. The method of claim 1, wherein the test pattern is mathematically perfect.

10. A Set Top Terminal (STT) configured for performing internal testing, comprising:
- a storage device configured to store at least one test pattern;
- at least one decoder configured to receive the at least one test pattern from the storage device, the at least one decoder further configured to decode the test pattern;
- a first digital encoder configured to receive the at least one decoded test pattern and convert the at least one decoded test pattern into an analog signal that represents the decoded test pattern;
- an analog output port that is configured to receive the analog signal for output from the STT;
- an analog input port that is configured to receive analog input signals to the STT;
- an attenuator element that connects between the analog output port and the analog input port in order to couple the analog signal from the analog output port to the analog input port;
- at least one tuning device coupled to the analog input port and configured to receive the analog signal and tune to a radio frequency (RF) channel according to the decoded test pattern represented by the analog signal;
- an analog-to-digital converter coupled to the tuning device and configured to convert the analog signal to a digital test pattern; and
- a second digital encoder configured to receive the digital test pattern from the analog-to-digital converter to generate an analog video signal for output to a testing device.

11. The STT of claim 10, further comprising a frame buffer coupled to the second digital encoder, the second frame buffer configured to hold the digital test pattern for delivery to the second digital encoder.

12. The STT of claim 10, wherein the analog output port and the analog input port are configured to convey RF signals.

13. The STT of claim 10, wherein the analog input port and the analog output port are configured to convey composite analog signals.

14. The STT of claim 10, wherein the storage device includes at least one of the following: Random Access Memory (RAM), Dynamic Random Access Memory (DRAM), flash memory, and a hard disk.

15. A system comprising the STT of claim 10, and a video measurement apparatus that is configured to receive the analog video signal from the second digital encoder to determine whether at least one component of the STT is operating properly.

16. The STT of claim 10, wherein the test pattern is mathematically perfect.

17. A computer readable storage medium for performing an internal test of a Set Top Terminal (STT), comprising:
- logic configured to store at least one test pattern;
- logic configured to retrieve the at least one stored test pattern;
- logic configured to buffer the retrieved test pattern;
- logic configured to decode the buffered test pattern to produce at least one decoded test pattern;
- logic configured to convert the at least one decoded test pattern into an analog signal that is coupled from an analog output port of the STT to an analog input port of the STT via an attenuator element;
- logic configured to tune the STT to an RF channel based on the decoded test pattern represented by the analog signal;
- logic configured to convert the analog signal to a digital test pattern; and
- logic configured to generate an analog video signal from the digital test pattern.

18. A system comprising an STT apparatus that comprises the computer readable storage medium of claim 17, and a video measurement system coupled to the STT that is configured to receive the analog video signal in order to determine whether at least one component of the STT is operating properly.

19. An STT comprising the computer readable storage medium of claim 17, wherein the analog input port and the analog output port are configured to convey Radio Frequency (RF) signals.

20. An STT comprising the computer readable storage medium of claim 17, wherein the analog input port and the analog output port are configured to convey composite analog signals.

21. The computer readable storage medium of claim 17, wherein the test pattern is mathematically perfect.

* * * * *